(12) United States Patent
Holmes

(10) Patent No.: US 9,534,703 B2
(45) Date of Patent: Jan. 3, 2017

(54) SINK AND SHOWER HANDLE RESTRAINT

(71) Applicant: Larry Holmes, Fort Collins, CO (US)

(72) Inventor: Larry Holmes, Fort Collins, CO (US)

( * ) Notice: Subject to any disclaimer, the term of this patent is extended or adjusted under 35 U.S.C. 154(b) by 0 days.

(21) Appl. No.: 14/625,574

(22) Filed: Feb. 18, 2015

(65) Prior Publication Data

US 2015/0233099 A1    Aug. 20, 2015

Related U.S. Application Data

(60) Provisional application No. 61/941,373, filed on Feb. 18, 2014.

(51) Int. Cl.
*F16K 35/10* (2006.01)
*E05C 1/04* (2006.01)
*F16K 35/14* (2006.01)

(52) U.S. Cl.
CPC ............... *F16K 35/10* (2013.01); *E05C 1/04* (2013.01); *F16K 35/14* (2013.01); *Y10T 29/49826* (2015.01)

(58) Field of Classification Search
CPC .............. E05C 1/04; Y10T 137/6977; Y10T 137/7043; Y10T 137/7062; Y10T 292/57; Y10T 292/861; Y10T 137/6014; Y10T 137/8766; Y10T 29/49826; F16K 27/045; F16K 35/00; F16K 35/10; F16K 35/14; F16K 11/0445; F16K 27/12
USPC ............... 70/199, 416, 430, 209, 238, 225, 226,70/175–178; 292/1, 288, 336.3, DIG. 65; 137/382, 385; 251/90
See application file for complete search history.

(56) References Cited

U.S. PATENT DOCUMENTS

| | | | | |
|---|---|---|---|---|
| 307,101 A * | 10/1884 | Cole | ............ | F16K 35/10 70/178 |
| 591,177 A * | 10/1897 | Palmer | ............ | E05B 13/04 70/430 |
| 1,084,996 A | 1/1914 | Wright | | |
| 1,293,362 A | 2/1919 | Day | | |
| 1,615,987 A | 2/1927 | Loewer | | |
| 1,620,051 A | 3/1927 | Zito | | |
| 1,636,392 A * | 7/1927 | Stubbs | ............ | E05B 13/04 70/430 |
| 2,463,195 A * | 3/1949 | Mungan | ............ | E05B 13/04 292/DIG. 2 |
| 2,838,064 A * | 6/1958 | Schieberl | ............ | F16K 27/12 126/42 |
| 3,578,026 A * | 5/1971 | Meyer, Jr. | ............ | B29C 65/58 138/110 |
| 3,585,827 A * | 6/1971 | Dominguez | ............ | E05B 13/04 70/416 |
| 4,041,738 A * | 8/1977 | Vann | ............ | E05B 73/0076 70/212 |

(Continued)

FOREIGN PATENT DOCUMENTS

EP    2 243 884 A1    10/2010

*Primary Examiner* — Suzanne Barrett
(74) *Attorney, Agent, or Firm* — Merchant & Gould P.C.

(57) ABSTRACT

Systems and methods are provided herein for restraining sink and shower handles. In a first aspect of a sink handle restraint, a first sink handle cuff fits over a first sink handle of a sink faucet, and a second sink handle cuff fits over a second sink handle of the sink faucet. The first sink handle cuff and second sink handle cuff slide along an elongated element that locks the first sink handle cuff and second sink handle cuff into place, preventing the first and second sink handles from being rotated into an "on" position.

7 Claims, 17 Drawing Sheets

(56) References Cited

U.S. PATENT DOCUMENTS

| | | | | |
|---|---|---|---|---|
| 4,084,414 | A * | 4/1978 | Martin | E05B 85/08 |
| | | | | 292/1 |
| 4,405,161 | A * | 9/1983 | Young | E21B 33/03 |
| | | | | 137/382 |
| 4,516,414 | A | 5/1985 | Woolvin | |
| 4,570,470 | A | 2/1986 | Gray, Sr. | |
| 4,735,230 | A | 4/1988 | Detloff | |
| 4,747,279 | A * | 5/1988 | Solow | B60R 25/008 |
| | | | | 70/199 |
| 4,803,858 | A | 2/1989 | Parker | |
| D317,497 | S | 6/1991 | Mast, Jr. | |
| 5,094,265 | A * | 3/1992 | Jackson | F16K 35/10 |
| | | | | 137/382 |
| 5,217,201 | A * | 6/1993 | Self | F16K 35/02 |
| | | | | 251/109 |
| 5,236,172 | A * | 8/1993 | Friemoth | F16K 35/06 |
| | | | | 137/385 |
| 5,263,853 | A | 11/1993 | Pall | |
| 5,267,458 | A | 12/1993 | Heh | |
| 5,557,955 | A * | 9/1996 | Kinsella | E03C 1/041 |
| | | | | 70/177 |
| 5,588,316 | A | 12/1996 | Jones | |
| 5,590,682 | A | 1/1997 | Fischer | |
| 5,701,768 | A * | 12/1997 | Khalsa | E05B 13/002 |
| | | | | 70/14 |
| 5,701,771 | A | 12/1997 | Bailey | |
| 5,799,521 | A * | 9/1998 | Kennedy | E05B 13/001 |
| | | | | 292/259 R |
| 5,868,016 | A * | 2/1999 | Duran, Sr. | B60R 25/0225 |
| | | | | 70/209 |
| 5,905,231 | A * | 5/1999 | Houte | B60R 16/0215 |
| | | | | 138/165 |
| 5,915,412 | A | 6/1999 | Helmsderfer | |
| 5,934,118 | A * | 8/1999 | Henness | B60R 25/093 |
| | | | | 70/226 |
| 5,992,192 | A | 11/1999 | Tual et al. | |
| 6,145,534 | A | 11/2000 | Romero | |
| 6,178,993 | B1 * | 1/2001 | Oberdorfer | E03C 1/042 |
| | | | | 137/356 |
| 6,311,530 | B1 | 11/2001 | Woodward | |
| 6,311,734 | B1 | 11/2001 | Petrovic | |
| 6,321,580 | B1 * | 11/2001 | Olson | A47K 13/242 |
| | | | | 292/DIG. 65 |
| 6,371,155 | B1 * | 4/2002 | Balocca | E03C 1/041 |
| | | | | 137/377 |
| 6,467,315 | B1 | 10/2002 | Edmondson | |
| 6,648,178 | B2 | 11/2003 | Grunewald | |
| 6,772,453 | B2 * | 8/2004 | Fine | E03C 1/041 |
| | | | | 137/382 |
| 6,889,394 | B2 | 5/2005 | Guillen | |
| 7,021,501 | B2 | 4/2006 | Bauer | |
| 7,048,315 | B2 * | 5/2006 | Wong | E05B 13/002 |
| | | | | 292/297 |
| 7,222,891 | B2 * | 5/2007 | Johansson | E05B 9/08 |
| | | | | 292/24 |
| 7,334,824 | B2 | 2/2008 | Sundberg et al. | |
| 7,416,230 | B2 * | 8/2008 | Konstantakis | E05B 13/002 |
| | | | | 292/1 |
| 8,402,798 | B2 * | 3/2013 | Brojanac | E05B 67/383 |
| | | | | 137/385 |
| 8,443,640 | B2 * | 5/2013 | Davis | E05B 13/002 |
| | | | | 292/288 |
| 8,851,535 | B2 * | 10/2014 | Miskel | E05C 19/186 |
| | | | | 292/258 |
| 9,062,789 | B2 * | 6/2015 | Buergi | F16K 31/605 |
| 2002/0078725 | A1 * | 6/2002 | Thompson | B60R 25/005 |
| | | | | 70/238 |
| 2006/0076787 | A1 * | 4/2006 | Sundberg | E05B 13/001 |
| | | | | 292/336.3 |
| 2010/0199727 | A1 * | 8/2010 | Varney | E05B 13/00 |
| | | | | 70/209 |
| 2011/0100486 | A1 * | 5/2011 | Brewton, III | A47K 3/005 |
| | | | | 137/382 |
| 2012/0111069 | A1 * | 5/2012 | Padjen | E05C 5/04 |
| | | | | 70/91 |
| 2013/0061449 | A1 * | 3/2013 | Powell | F16K 35/10 |
| | | | | 29/525.01 |
| 2015/0198343 | A1 * | 7/2015 | Huber | F24F 7/02 |
| | | | | 454/358 |
| 2015/0233099 | A1 * | 8/2015 | Holmes | F16K 35/10 |
| | | | | 251/90 |

* cited by examiner

SINK AND SHOWER HANDLE RESTRAINT

CROSS-REFERENCE TO RELATED APPLICATIONS

This application claims the benefit of U.S. Provisional Application Ser. No. 61/941,373, entitled "SINKS AND SHOWER HANDLE RESTRAINTS," filed on Feb. 18, 2014, the entire disclosure of which is hereby incorporated herein by reference.

BACKGROUND

Generally, control handles for residential sink and shower water valves are within reach of small children. A child that can reach a water valve control handle for a sink or shower may trigger undesired water use that can cause overflow of water, scalding, or even drowning. Reports have shown that significant numbers of children have been scalded due to excessively hot water and have drowned in bathtubs. Many of these injuries and deaths have occurred when a caregiver was not present and many could have been prevented. A device that prevents such accidents is needed.

It is with respect to these and other general considerations that embodiments have been disclosed herein. Also, although relatively specific problems have been discussed, it should be understood that the embodiments should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment describes a sink handle restraint including a first sink handle cuff that includes a first hollow cylindrical body adapted to slide over a first sink handle and a first protruding conduit defining a first gap, where the first protruding conduit is formed on an outer surface of the first hollow cylindrical body. The sink handle restraint further including a second sink handle cuff including a second hollow cylindrical body adapted to slide over a second sink handle and a second protruding conduit defining a second gap, where the second protruding conduit is formed on an outer surface of the second hollow cylindrical body. The sink handle restraint further including an elongated element including a first end opposite a second end, the first end adapted to pass into the first gap defined by the first protruding conduit and the second end adapted to pass into the second gap defined by the second protruding conduit thereby adjustably coupling the first sink handle cuff to the second handle cuff.

Another embodiment describes a shower handle restraint including a circular cover plate that has a radial pathway defined between an outer border of the circular cover plate and an inner border of the circular cover plate, where the radial pathway includes a plurality of serrated grips. The shower handle restraint further includes a shower handle cuff including a hollow cylindrical body adapted to slide over a shower handle, and a base defining a guide adapted to slide along the radial pathway of the circular cover plate and engage at least one serrated grip.

Another embodiment describes a method for installing a sink handle restraint, the method including sliding a first sink handle cuff over a first sink handle and inserting a first end of an elongated element into a first protruding conduit of the first sink handle cuff. The method further includes sliding a second sink handle cuff over a second sink handle and inserting a second end of the elongated element into a second protruding conduit of the second sink handle cuff thereby coupling the first sink handle cuff to the second sink handle cuff.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the claims.

DETAILED DESCRIPTION

As disclosed herein, an apparatus is provided that may restrain a sink or shower handle. The apparatus may be easily installed and removed by someone other than a small child. However, the restraint may keep a small child (or one who is elderly, infirm, or has special needs) from turning the sink or shower handle to in undesired position, thereby preventing inadvertent harm to the child (or one who is elderly, infirm, or has special needs).

Systems and methods are provided herein for restraining sink and shower handles. In a first aspect of a sink handle restraint, a first sink handle cuff fits over a first sink handle of a sink faucet, and a second sink handle cuff fits over a second sink handle of the sink faucet. The first sink handle cuff and second sink handle cuff slide along an elongated element that locks the first sink handle cuff and second sink handle cuff in place, preventing the first and second sink handles from being turned.

In a second aspect of a sink handle restraint, a first sink handle cuff fits over a first sink handle of a sink faucet, and a second sink handle cuff fits over a second sink handle of the sink faucet. The second sink handle cuff slides along an elongated locking element coupled to the first sink handle cuff, thereby coupling the first sink handle cuff and the second sink handle cuff and preventing the first and second sink handles from being turned.

In a third aspect of a shower handle restraint, a shower handle cuff fits over a shower handle, and a base of the shower handle cuff locks onto a circular cover plate. The circular cover plate is attached to a wall of a shower or a base of the shower handle. When the shower handle cuff is fitted over a shower handle and locked onto the circular cover plate, the sink handle is prevented from being turned.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art.

Embodiments may be practiced as methods, systems or devices. The following detailed description is, therefore, not to be taken in a limiting sense.

Figure 1:
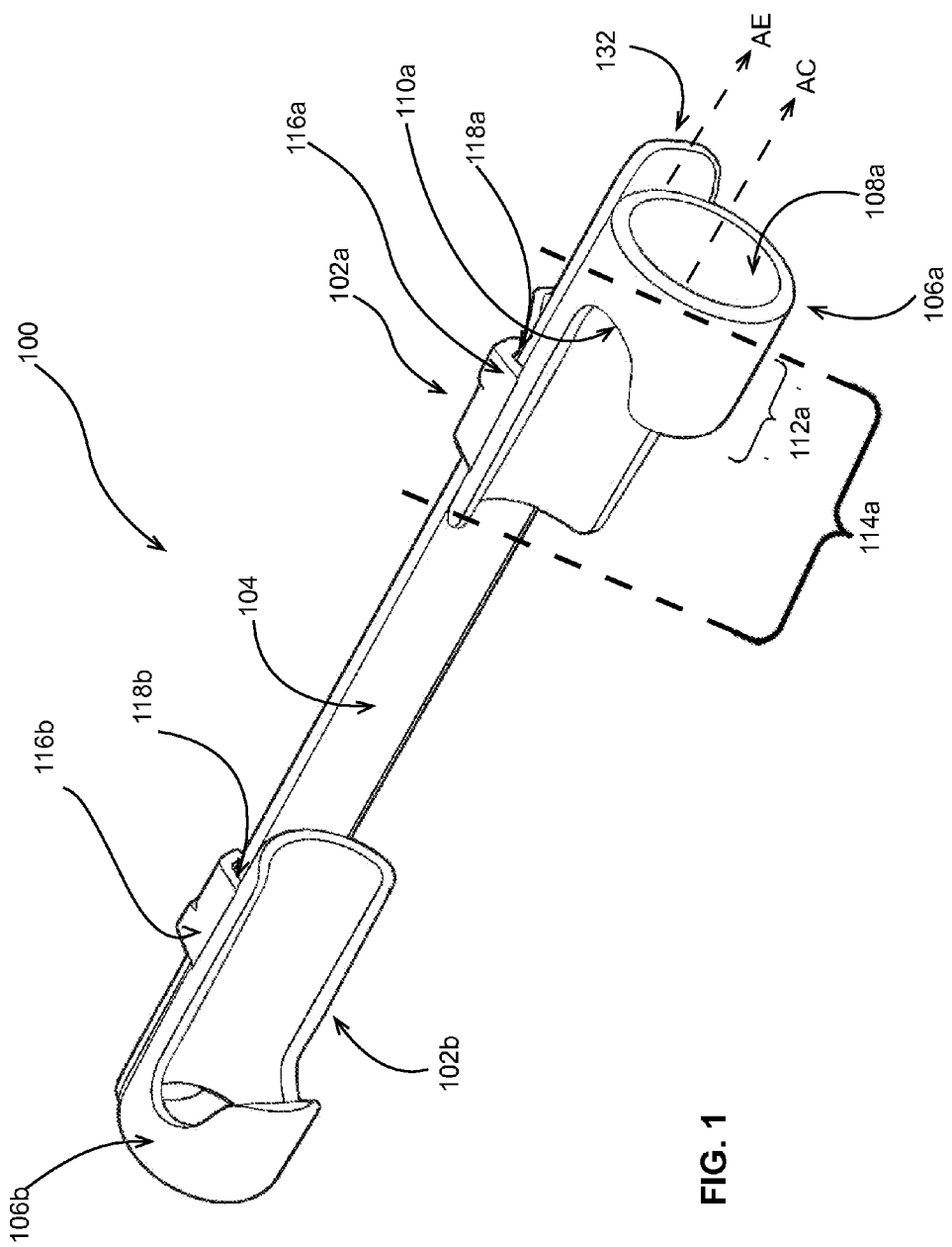
FIG. 1 illustrates a front perspective view of an embodiment of a sink handle restraint.
Figure 2:
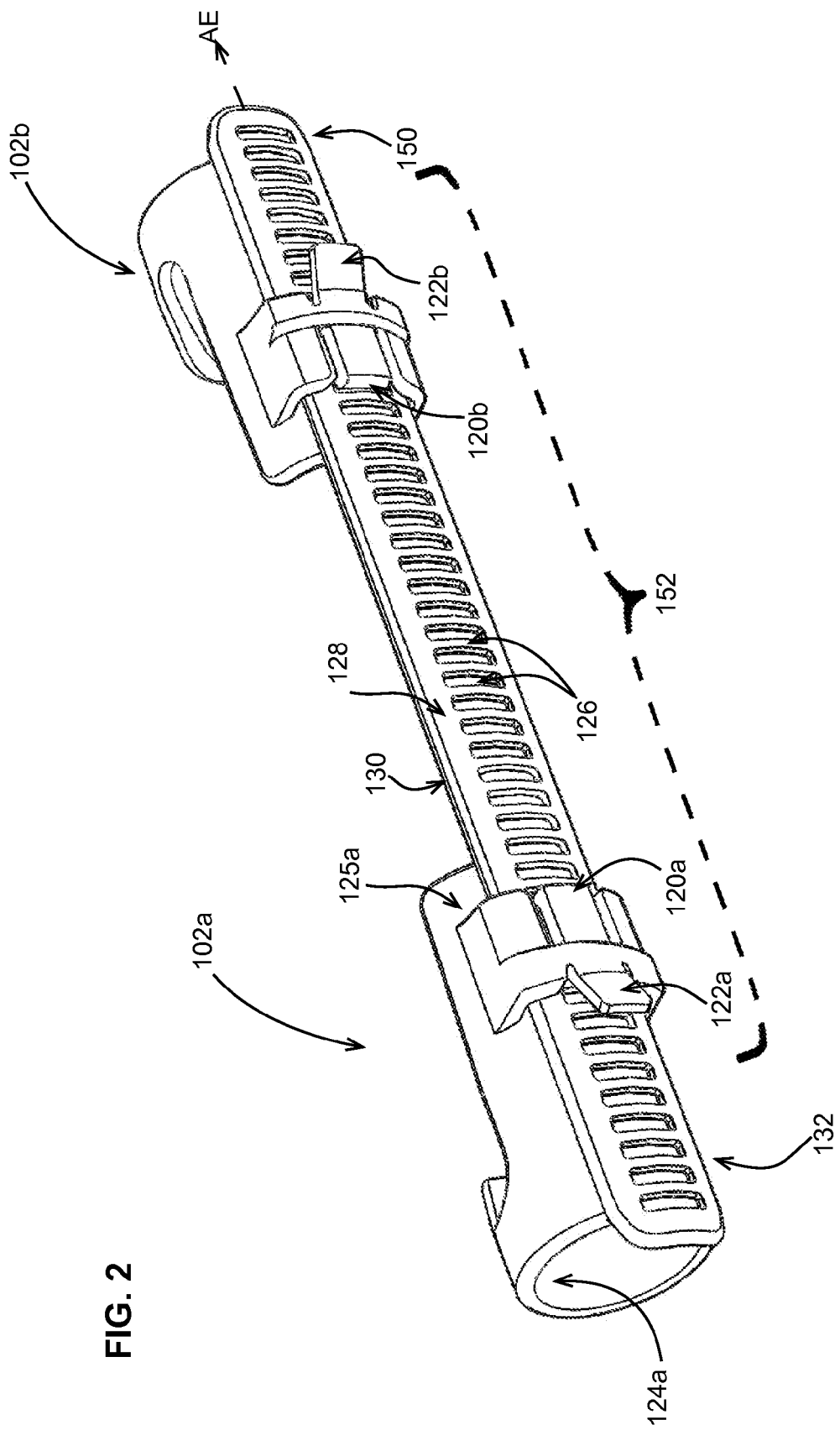
FIG. 2 illustrates a rear perspective view of an embodiment of a sink handle restraint.

FIGS. 1 and 2 illustrate a front perspective view and rear perspective view of an embodiment of a sink handle restraint 100, respectively. FIGS. 1 and 2 will be described simultaneously. Sink handle restraint 100 includes a first sink handle cuff 102a, a second sink handle cuff 102b, and an elongated element 104. First sink handle cuff 102a and second sink handle cuff 102b are defined by a cuff axis $A_C$. For purposes of simplifying the present disclosure, first sink handle cuff 102a will be thoroughly described herein. However, it should be appreciated that second handle cuff 102b is substantially the same as first sink handle cuff 102a and includes corresponding components and features.

For example, sink handle cuff 102a may include a substantially hollow cylindrical body 106a that defines an open end 108a and a receiving end 110a. In aspects, sink handle cuff 102a may further include a first longitudinal extension 112a from at least one side of the hollow cylindrical body 106a. For example, first longitudinal extension 112a may be semi-cylindrical and may be useful for gripping a sink handle such that it is guided into hollow cylindrical body 106a. This gripping function enables secure connections and facilitates installation for various sized and shaped handles. In a second example, the hollow cylindrical body 106a may not include a first longitudinal extension 112a. Additionally or alternatively, sink handle cuff 102a may include a second longitudinal extension 114a from at least one side of the hollow cylindrical body 106a. In some aspects, the first longitudinal extension 112a may extend from an opposite side of the hollow cylindrical body 106a than the second longitudinal extension 114a. The second longitudinal extension 114a may be semi-cylindrical. In further aspects, the second longitudinal extension 114a may extend farther longitudinally from hollow cylindrical body 106a than first longitudinal extension 112a.

Additionally, sink handle cuff 102a may include a protruding conduit 116a that defines a gap 118a adapted to receive elongated element 104. In embodiments, protruding conduit 116a may extend from an outer surface 125a of a back side of second longitudinal extension 114a. Additionally, protruding conduit 116a may include a locking element 120a. Locking element 120a may be a tab, tooth, lip, flange, pawl, or other type of engaging element formed in or coupled to protruding conduit 116a. Further, protruding conduit 116a may include a release tab 122a on an opposing side of protruding conduit 116a from the locking element 120a. Release tab 122a may be formed with or coupled to locking element 120a so as to counterbalance actuation of locking element 120a.

Hollow cylindrical body 106a of sink handle cuff 102a defines a receiving end 110a that is adapted to fit over a variety of sizes of sink handles (not shown). In some aspects, an inner cylindrical surface 124a of sink handle cuff 102a may include a liner (not shown) that may act as a buffer element between inner cylindrical surface 124a and an outer surface of a sink handle (not shown). For example, the liner may prevent scratching of sink handles and may facilitate a more secure fit for sink handle cuffs 102a and 102b. In aspects, the liner may be made of rubber, silicone, plastic, felt, and the like. Sink handle cuff 102b is substantially the same as sink handle cuff 102a, and therefore incorporates the same or similar descriptions. For example, sink handle cuff 102b may include a substantially hollow cylindrical body 106b having a protruding conduit 116b that defines a gap (or opening) 118b and includes a locking element 120b with a release tab 122b, etc.

Elongated element 104 may include a first end 132 and an opposing second end 150 connected by an elongated central portion 152. In aspects, the elongated element 104 may include a midpoint that is substantially equidistant from the first end 132 and the second end 150 within the elongated central portion 152. Elongated element 104 may further have both rigid and flexible properties. That is, the elongated element 104 may be at least partially rigid and at least partially flexible. In aspects, the elongated element 104 may be suitably rigid so as to securely couple sink handle cuff 102a and sink handle cuff 102b such that first and second sink handles are firmly held in an "off" position. In other aspects, the elongated element 104 may be suitably flexible such that the sink handle restraint 100 is adapted for easy installation and adjustable for different sizes, styles and positioning of sink handles. For example, the elongated element 104 may be in the form of an elongated rectangular strap, band, belt, bracket, brace, or the like. Elongated element 104 is defined by an elongated axis, $A_E$.

In addition, elongated element 104 may have a plurality of slots (e.g., slots 126) located along one or both sides. For example, each of the plurality of slots 126 is positioned with substantially uniform spacing along the elongated element 104 in an orthogonal orientation with respect to axis $A_E$. In aspects, slots 126 may extend from an upper surface 128 through an interior and out a lower surface 130 to form a plurality of apertures through elongated element 104. In other aspects, slots 126 may extend from the upper surface 128 into the interior to form a plurality of grooves or indentions in elongated element 104. In still other aspects, slots 126 may be in the form of raised ridges along the elongated element 104. The plurality of slots 126 may be adapted to receive or engage the locking element 120a of sink handle cuff 102a (and/or a corresponding locking element 120b of sink handle cuff 102b).

In aspects, the locking element 120a may engage at least one slot of the plurality of slots 126. For example, locking element 120a may adjustably engage a first slot of the plurality of slots 126 such that sink handle cuff 102a is in a first position with respect to the elongated element 104. Alternatively, locking element 120a may adjustably engage a second slot of the plurality of slots 126 such that sink handle cuff 102a is in a second position with respect to the elongated element 104. In embodiments, the sink handle cuff 102a may be closer to the midpoint of the elongated element 104 when engaged in the first position than in the second position. Thus, the sink handle cuff 102a may be adjustably positioned along the elongated element 104 by selectively engaging different slots of the plurality of slots 126.

Sink handle cuff 102a, sink handle cuff 102b, and elongated element 104 may be made of any suitable material, e.g., plastic, rubber, metal, metal alloy, etc. In aspects, sink handle cuff 102a, sink handle cuff 102b, and elongated element 104 may be made of substantially the same material or different materials. Moreover, the sink handle cuff 102a, sink handle cuff 102b, and elongated element 104 may be manufactured or produced by any suitable method, e.g., machining, molding, casting, forming, joining, pressing, 3D printing, etc.

Figure 3A:
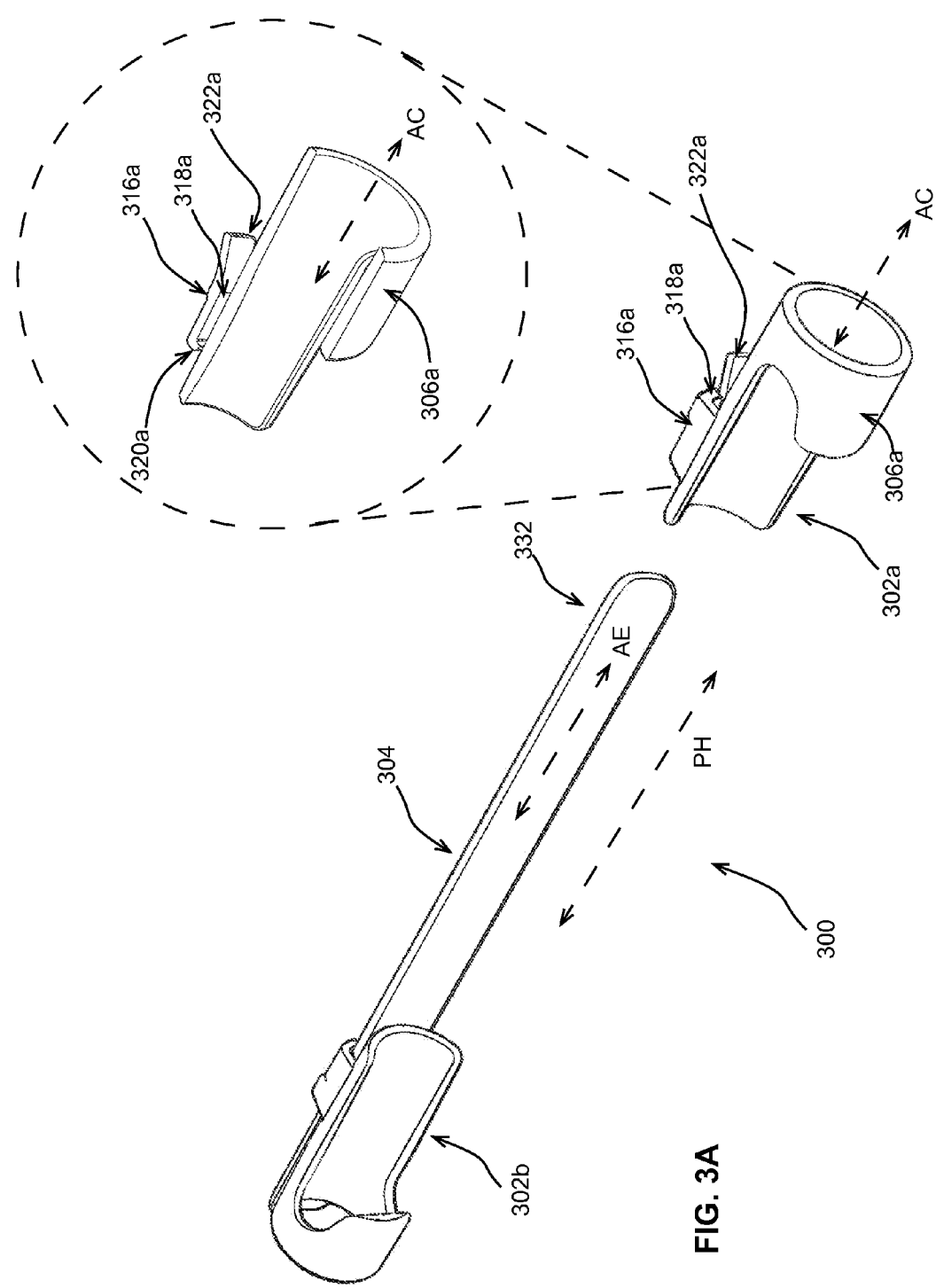
FIG. 3A illustrates a front partially exploded perspective view of an embodiment of a sink handle restraint.

FIG. 3A illustrates a front partially exploded perspective view of an embodiment of a sink handle restraint 300. Components of sink handle restraint 300 are described above with respect to FIGS. 1 and 2 and are not necessarily described further. In aspects, sink handle cuff 302a and sink handle cuff 302b are slidably engageable with elongated element 304. For example, sink handle cuff 302a may slidably engage elongated element 304 by moving sink handle cuff 302a within a horizontal plane, $P_H$, in a direction substantially parallel to axis $A_E$ of the elongated element 304. For example, upon sliding sink handle cuff 302a along elongated element 304, gap 318a (defined by protruding conduit 316a as illustrated by inserted cross-sectional view) receives an end 332 of elongated element 304. The sink handle cuff 302a may be further advanced along elongated element 304 to a desired position. In aspects, upon reaching the desired position, locking element 320a (see inserted cross-sectional view) of the sink handle cuff 302a may engage at least one slot (not shown) of the elongated element 304 thereby coupling sink handle cuff 302a to elongated element 304.

In the same manner as described above, sink handle cuff 302a may be slidably removed and detached from elongated element 304. For example, release tab 322a may be actuated to disengage locking element 320a (see inserted cross-sectional view) from the at least one slot, thereby disengaging the sink handle cuff 302a from the elongated element 304. In aspects, locking element 320a (see inserted cross-sectional view) may be disengaged by pressing down on release tab 322a thereby tensionally disengaging locking element 320a from the at least one slot. In some aspects, sink handle cuff 302a may be slidably removed and detached from elongated element 304 while release tab 322a is pressed down or actuated. In other aspects, actuating release tab 322a will disengage locking element 320a until locking element 320a is reengaged or actuated, allowing sink handle cuff 302a to be slidably removed and detached from elongated element 304 without continually pressing down or actuating release tab 322a. In this embodiment, activation of release tab 322a may actuate locking element 320a between a locked (closed) position and an unlocked (open) position.

Figure 3B:
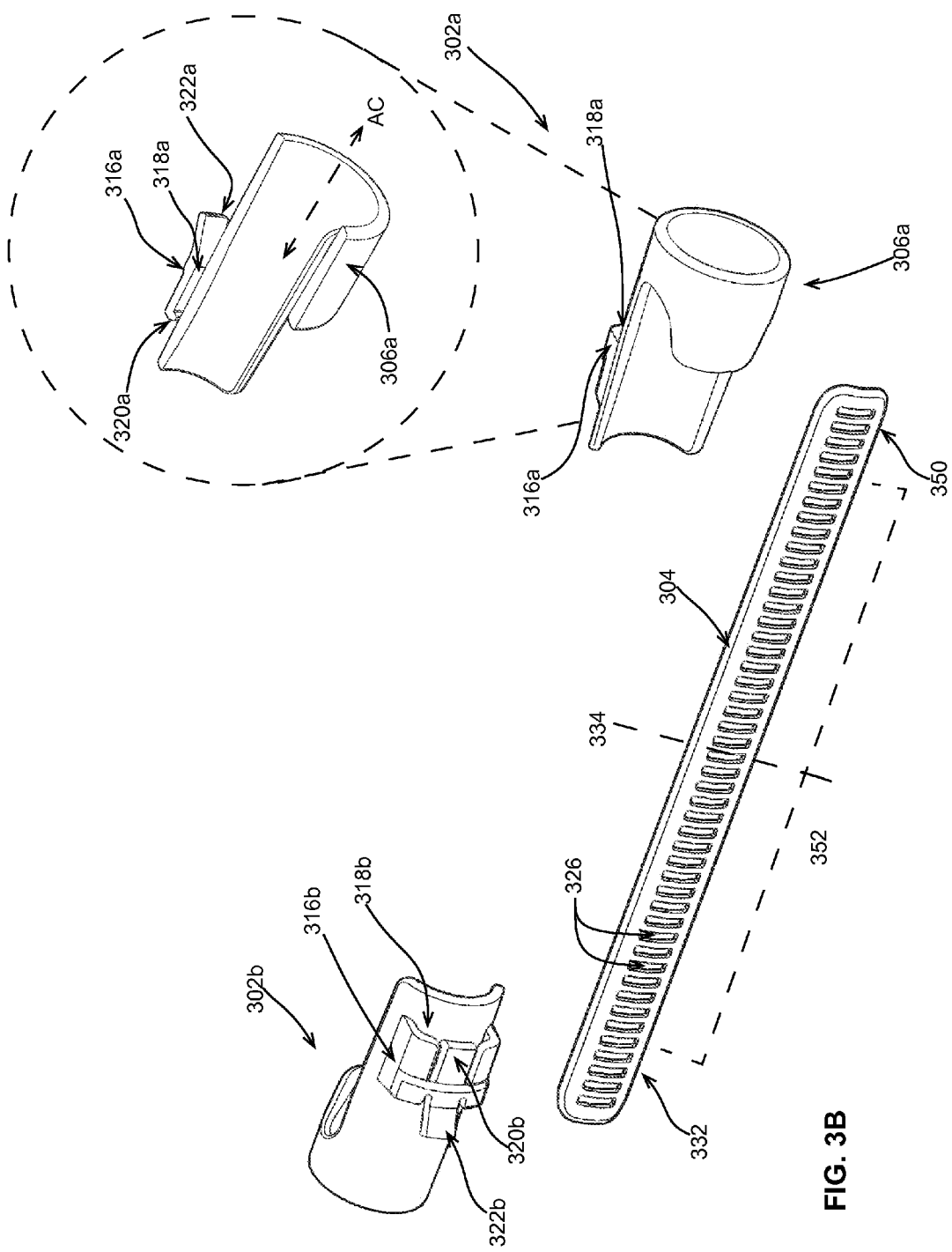
FIG. 3B illustrates an exploded perspective view of an embodiment of a sink handle restraint.

FIG. 3B illustrates an exploded perspective view of an embodiment of sink handle restraint 300. Components of sink handle restraint 300 are described above with respect to FIGS. 1, 2, and 3A and are not necessarily described further. As more fully illustrated by sink handle cuff 302b, protruding conduit 316b includes locking element 320b that may be in the form of a resilient tab, tooth, pawl, flange or other type of engaging element. Additionally, release tab 322b may be located opposite the locking element 320b on protruding conduit 316b. As described with respect to FIG. 3A, upon sliding elongated element 304 through protruding conduit 316b, locking element 320b may engage at least one slot 326 of elongated element 304, thereby slidably engaging sink handle cuff 302b with elongated element 304. Similarly, sink handle cuff 302a may be slidably engaged with elongated element 304 upon engaging a locking element 320a with at least one other slot 326. When engaged in this manner, sink handle cuff 302a and sink handle cuff 302b may be coupled via elongated element 304 and may be securely maintained in the desired position relative to one another and to the elongated element 304.

In further aspects, sink handle cuff 302a may be adjustably positioned with respect to sink handle cuff 302b by selectively engaging locking elements 320a and 320b with various slots 326. For example, in a first position, sink handle cuff 302a may be positioned closer to a midpoint 334 of the elongated element 304. In the first position, sink handle cuff 302a and sink handle cuff 302b may be coupled closer to one another along the elongated element 304. Additionally, in the first position, sink handle cuff 302a and sink handle cuff 302b may be more tightly coupled to one another. Alternatively, in a second position, sink handle cuff 302a may be positioned farther from the midpoint 334 of the elongated element 304. In the second position, sink handle cuff 302a and sink handle cuff 302b may be coupled farther from one another along the elongated element 304. Additionally, in the second position, sink handle cuff 302a and sink handle cuff 302b may be more loosely coupled to one another. In some embodiments, positioning of sink handle cuff 302a with respect to sink handle cuff 302b is based at least in part on a positioning of a first sink handle with respect to a second sink handle. In this regard, sink handle cuff 302a may be adjustably positioned along the elongated element 304 so as to accommodate variable positioning of a first sink handle and a second sink handle while maintaining tight coupling between sink handle cuffs 302a and 302b.

To detach and remove sink handle cuff 302a from elongated element 304, release tab 322a may be pressed or otherwise actuated thereby tensionally disengaging locking element 320a from the at least one slot 326 of elongated element 304. While the release tab 322a is held down or otherwise actuated, sink handle cuff 302a may be slidably removed and detached from elongated element 304 in a manner as described with respect to FIG. 3A. Alternatively, upon actuating release tab 322a, sink handle cuff 302a may be slidably removed and detached from elongated element 304.

Figure 4:
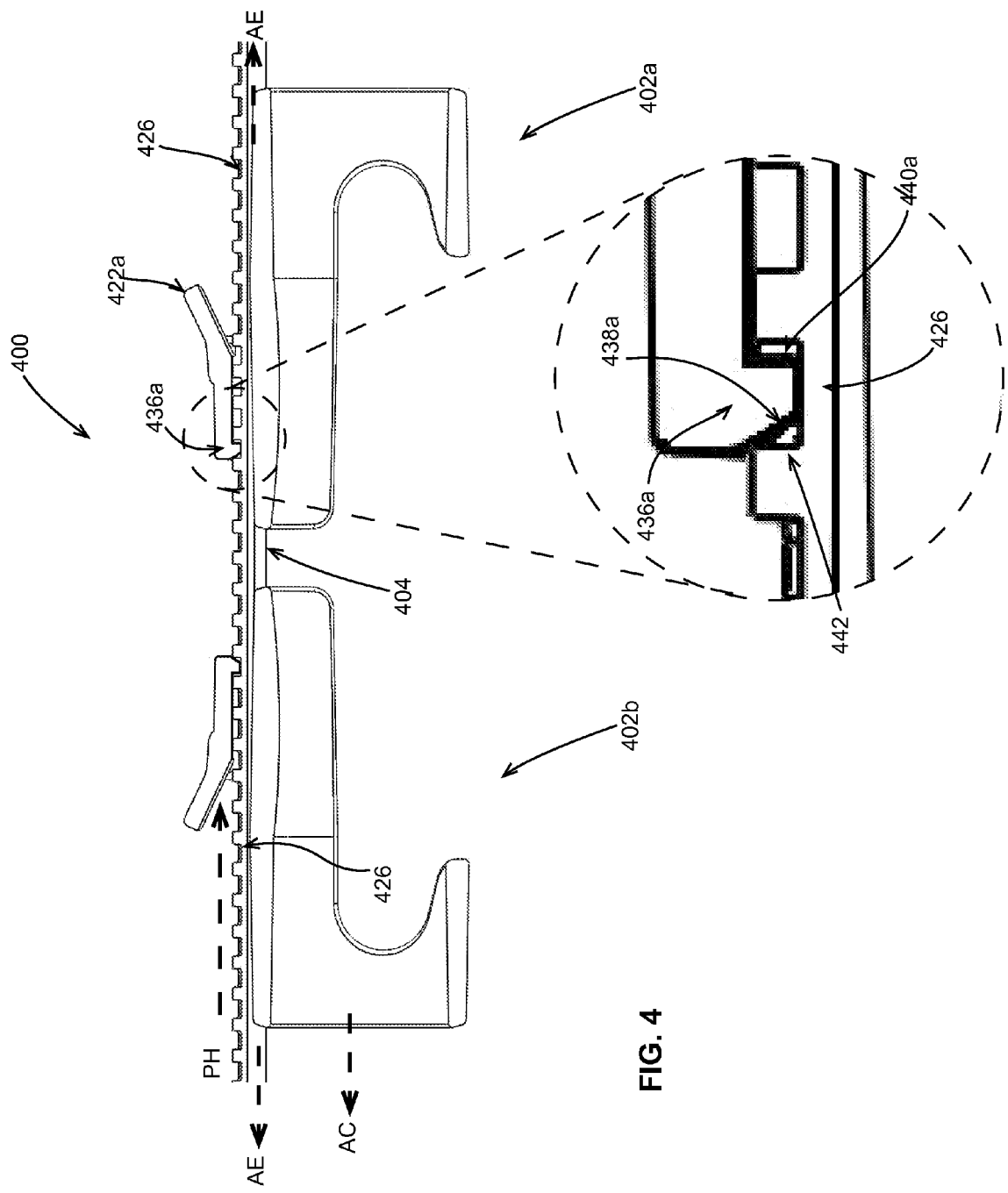
FIG. 4 illustrates a partial cross-sectional view of a locking element engaging an elongated element in an embodiment of a sink handle restraint.

FIG. 4 illustrates a partial cross sectional view of locking element 420a engaging elongated element 404 in an embodiment of sink handle restraint 400. Components of the sink handle restraint 400 are described above with respect to FIGS. 1, 2, 3A, and 3B and are not necessarily described further. The first and second sink handle cuffs described in the above figures are not shown in their entirety in FIG. 4. Rather, the illustrated embodiment provides at least one example in which locking element 420a engages a slot 426 of elongated element 404. In this embodiment, locking element 420a is a tooth 436a that includes a sloped leading face 438a and a laterally offset trailing face 440a. Tooth 436 may be substantially in the shape of a rectangular pyramid or prism. Trailing face 440a may be substantially orthogonal to the elongated element 404 and slots 426. In aspects, sink handle cuff 402a may be slidably engaged with elongated element 404 by advancing sink handle cuff 402a along a horizontal plane, $P_H$, which is substantially parallel to the elongated axis, $A_E$, of elongated element 404 and the cuff axis, $A_C$, of the sink handle cuff 402a. While the sink handle cuff 402a is being advanced in the horizontal plane $P_H$, tooth 436a deflects (via the sloped leading face 438a) off of an edge (e.g., edge 442) of a slot 426 of the elongated element 404. When the sink handle cuff 402a is in the desired position, tooth 436a may return from the deflection to fit into and/or engage slot 426. For example, trailing face 440a of tooth 436a may engage edge 442 of slot 426 to prevent the sink handle cuff 402a from being withdrawn in an opposite direction within the horizontal plane $P_H$ (e.g., in a direction away from the handle) unless a release tab 422a is actuated to disengage tooth 436a from slot 426. Sink handle cuff 402a and sink handle cuff 402b may include substantially the same elements, and therefore sink handle cuff 402b may be slidably engaged and disengaged with elongated element 404 in substantially the same or similar manner as sink handle cuff 402a.

Figure 5:
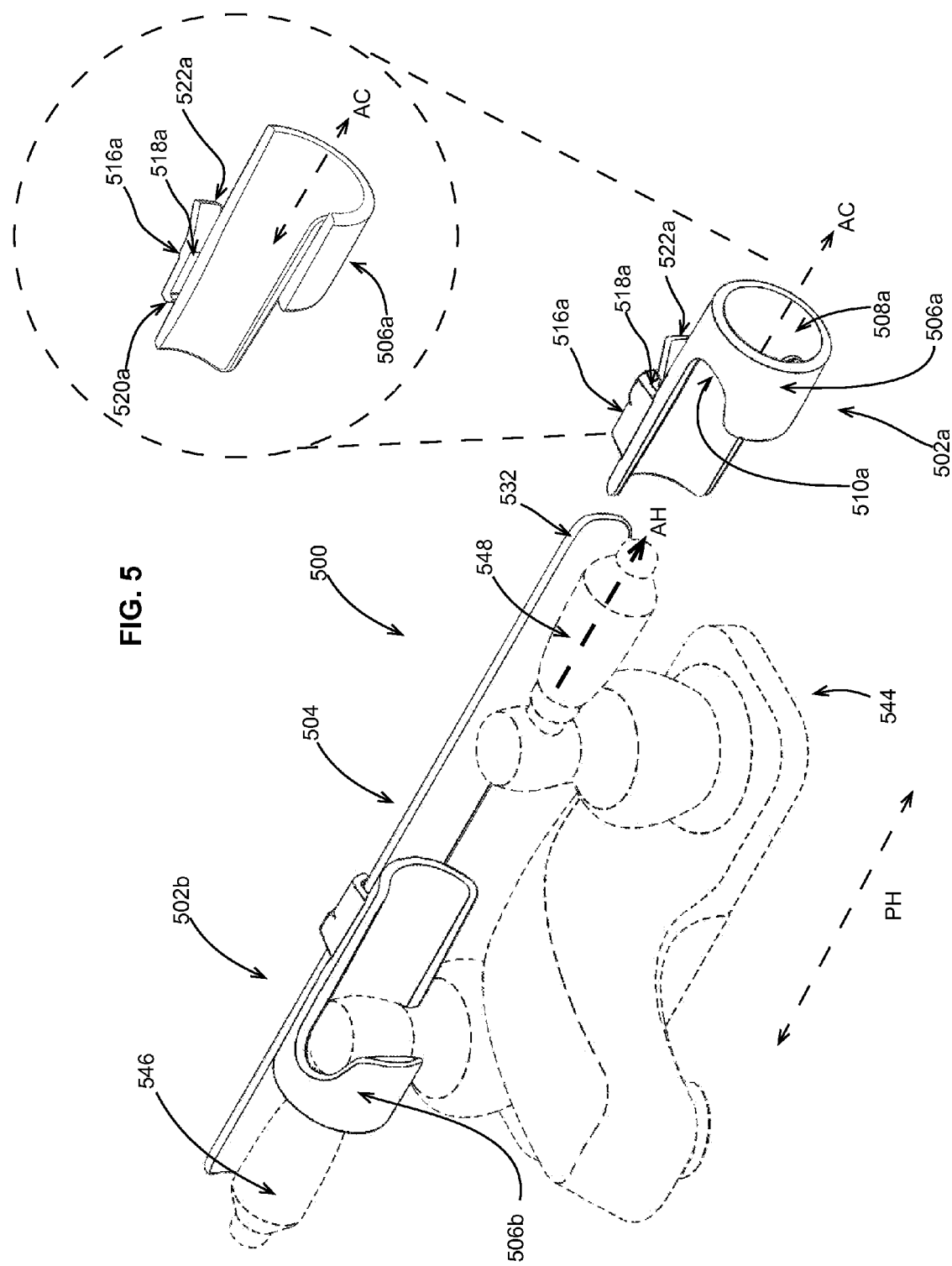
FIG. 5 illustrates a front perspective view of an embodiment of a sink handle restraint partially assembled on a faucet.

FIG. 5 illustrates a front perspective view of an embodiment of sink handle restraint 500 partially assembled on a faucet 544. Components of the sink handle restraint 500 are described above with respect to FIGS. 1, 2, 3A, 3B, and 4 and are not necessarily described further. In this view, sink handle cuff 502b is engaged with elongated element 504, and sink handle 546 is held substantially within hollow cylindrical body 506b of sink handle cuff 502b. As illustrated, sink handle cuff 502a is detached from elongated element 504 and sink handle 548. In aspects, sink handle 548 has a handle axis, $A_H$, and sink handle cuff 502a has a cuff axis, $A_c$. To engage sink handle cuff 502a with elongated element 504 and sink handle 548, sink handle cuff 502a may be advanced in the horizontal plane $P_H$ in a direction substantially parallel to axes $A_c$ and $A_H$ (which axes are substantially parallel to one another) towards sink handle 548. In aspects, gap 518a (see inserted cross-sectional view) defined by protruding conduit 516a of sink handle cuff 502a may receive end 532 of elongated element 504 such that handle 548 passes into receiving end 510a of sink handle cuff 502a. In some aspects, depending on a length of sink handle 548, at least a portion of sink handle 548 may extend out of open end 508a. In some instances, a proximal portion of sink handle 548 may be substantially within or enveloped by sink handle cuff 502a, and a distal portion of sink handle 548 may extend out of open end 508a. In this case, ornamental aspects of the distal portion of sink handle 548 may be visible to a user in order to preserve esthetically pleasing aspects of faucet 744 while at the same time preventing sink handle 548 from being actuated to an "on" or "hot" position. In other aspects, sink handle cuff 502a may be advanced to a position wherein sink handle 548 is held substantially within hollow cylindrical body 506a of sink handle cuff 502a. Further, upon advancing sink handle cuff 502a along elongated element 504, the locking element 520a (see inserted cross-sectional view) may be engaged with at least one slot (not shown) of the elongated element 504.

In aspects, removal of sink handle cuff 502a may involve pressing or otherwise actuating a release tab 522a (see inserted cross-sectional view), which may disengage locking element 520a from the at least one slot (not shown). Upon disengaging the locking element 520a, sink handle cuff 502a may be removed by withdrawing the sink handle cuff 502a away from sink handle 548 along the elongated element 504 in the horizontal plane, $P_H$, which is substantially parallel to axes $A_H$ of the sink handle 548 and $A_c$ of the sink handle cuff 502a. Sink handle cuff 502b may be similarly engaged and removed from elongated element 504.

Figure 6:
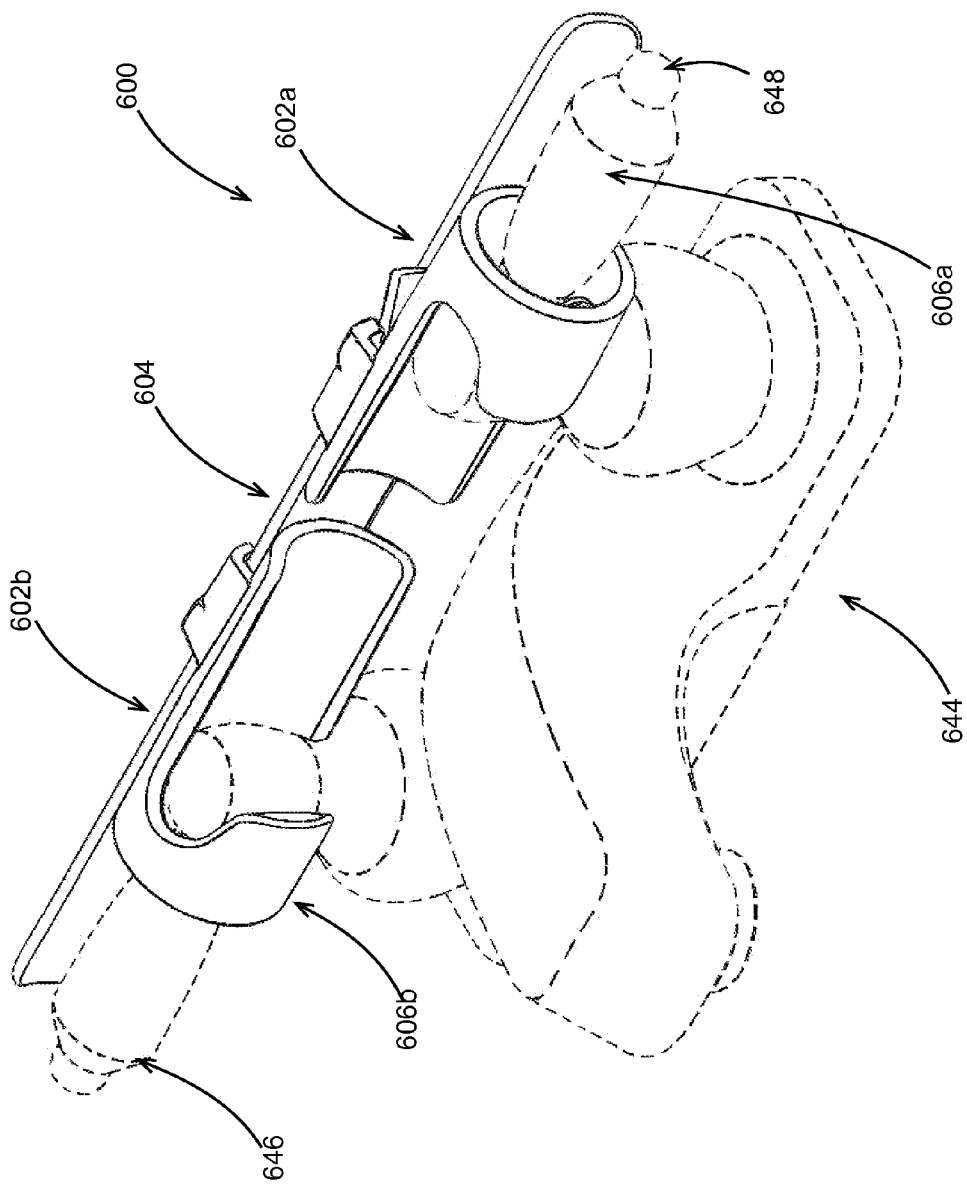
FIG. 6 illustrates a front perspective view of an embodiment of a sink handle restraint assembled on a faucet.

FIG. 6 illustrates a front perspective view of an embodiment of a sink handle restraint 600 assembled on a faucet 644. Components of sink handle restraint 600 are described above with respect to FIGS. 1, 2, 3A, 3B, 4, and 5, and are not necessarily described further. This view illustrates sink handle restraint 600 installed or assembled on faucet 644. When installed, sink handle restraint 600 is in a locked position. When in a locked position, locking elements (not shown) of sink handle cuffs 602a and 602b are engaged with at least two slots (not shown) of elongated element 604. Further, sink handles 646 and 648 are held substantially within hollow cylindrical bodies 606a and 606b of sink handle cuffs 602a and 602b, respectively. When in a locked position, sink handle cuffs 602a and 602b are coupled firmly to one another via elongated element 604 thereby preventing sink handles 646 and 648 from opening one or more valves of the sink faucet to an undesired "on" or "hot" position.

Figure 7:
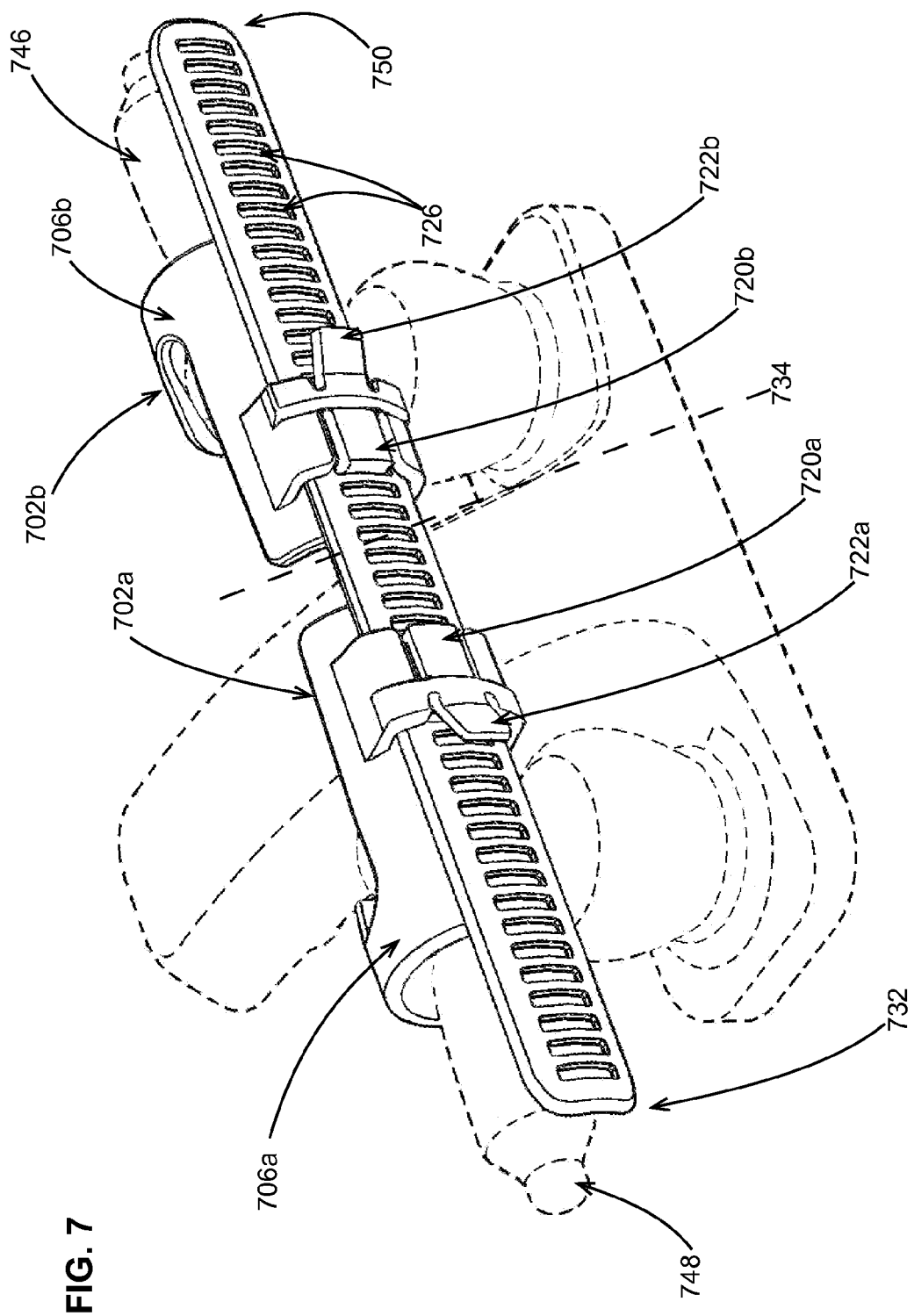
FIG. 7 illustrates a rear perspective view of an embodiment of a sink handle restraint assembled on a faucet.

FIG. 7 illustrates a rear perspective view of an embodiment of a sink handle restraint 700 assembled on a faucet 744. Components of sink handle restraint 700 are described above with respect to FIGS. 1, 2, 3A, 3B, 4, 5, and 6 and are not necessarily described further. This view illustrates sink handle restraint 700 installed on a faucet 744 such that sink handles 746 and 748 are in a locked position. When in a locked position, locking elements 720a and 720b of sink handle cuffs 702a and 702b, respectively, are engaged with at least two slots 726 of elongated element 704. Further, sink handles 748 and 746 are held by or within hollow cylindrical bodies 706a and 706b of sink handle cuffs 702a and 702b, respectively. When in a locked position, sink handles 748 and 746 are held substantially in place by sink handle cuffs 702a and 702b, thereby preventing the sink handles 748 and 746 from being turned to an undesired "on" or "hot" position.

As detailed above, elongated element 704 may include a plurality of slots 726. Thus, in aspects, sink handle restraint 700 has a wide range of adjustability and may be configured for a variety of faucet embodiments. For example, as illustrated in FIGS. 5, 6, and 7, each faucet embodiment depicts sink handles that are directed radially from one another and located substantially adjacent to a faucet spout from which liquid is dispensed. In these depicted faucet embodiments, sink handle cuffs are located substantially near a midpoint 734 of elongated element 704. However, in a different faucet embodiment, the sink handles may be spaced further apart from one another and/or further away from the faucet spout from which liquid is dispensed. In this aspect, sink handle cuffs 702a and 702b may be spaced farther apart, i.e., towards ends 732 and 750 of elongated element 704. It should be appreciated that due to the flexibility of the present system, in embodiments where sink handle cuffs are spaced farther apart, sink handle restraint 700 is still able to restrict rotation of the respective sink handles 746 and 748.

Figures 8A, 8B:
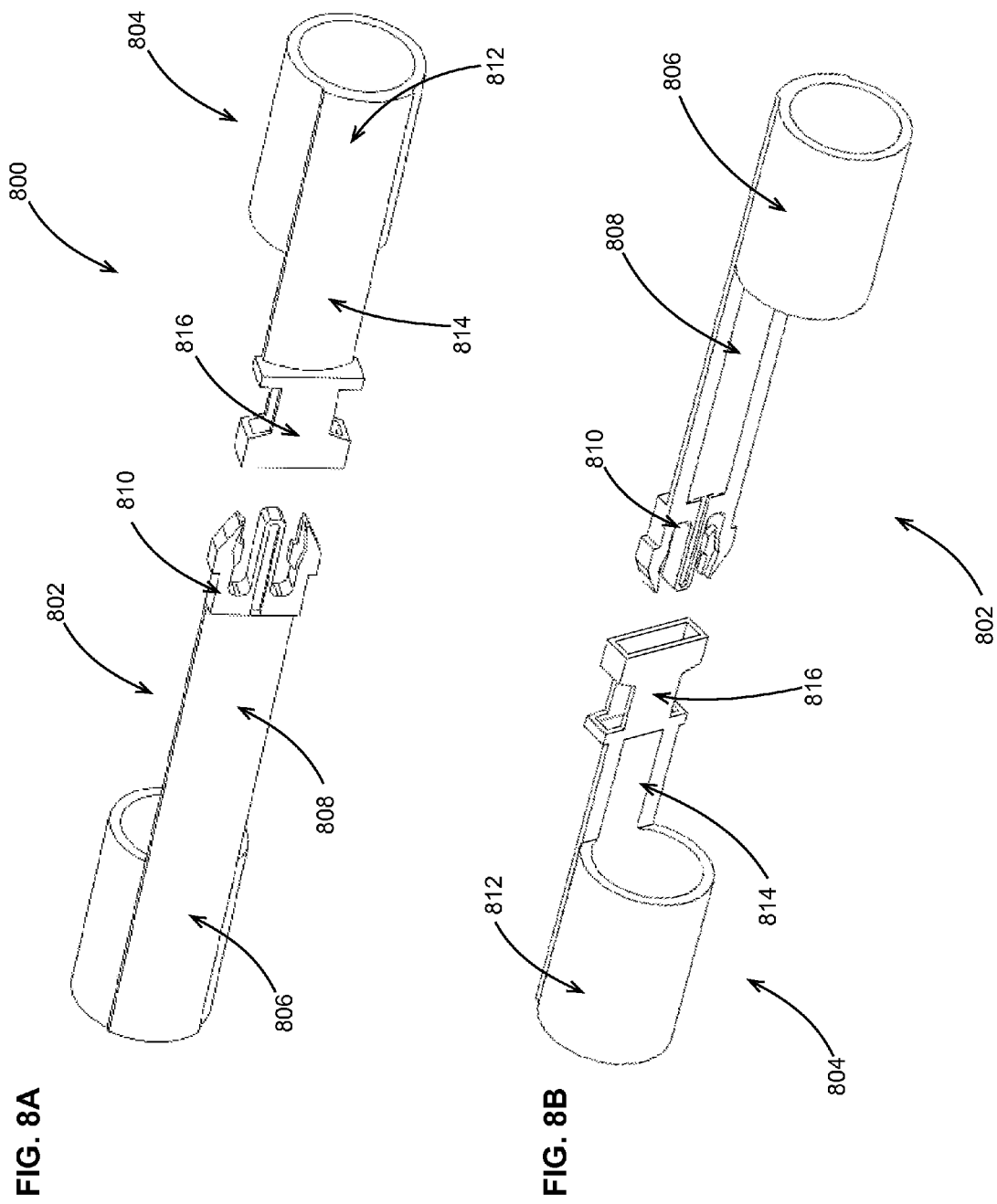
FIG. 8A illustrates a rear perspective view of another embodiment of a sink handle restraint.
FIG. 8B illustrates a front perspective view of another embodiment of a sink handle restraint.

FIGS. 8A and 8B illustrate a rear perspective view and a front perspective view, respectively, of another embodiment of a sink handle restraint 800. FIGS. 8A and 8B will be described simultaneously. Sink handle restraint 800 includes a male part 802 and a female part 804. Male part 802 includes a sink handle cuff 806, a strut 808, and a male locking member 810. In aspects, the strut 808 extends between the sink handle cuff 806 and the male locking member 810 such that the sink handle cuff 806 is at an opposite end of strut 808 from the male locking member 810.

Female part 804 includes a sink handle cuff 812, a strut 814, and a female locking member 816. The strut 814 extends between the sink handle cuff 812 and the female locking member 816 such that sink handle cuff 812 is at an opposite end from the female locking member 816.

When sink handle restraint 800 is in use, the sink handle cuffs 806 and 812 envelope sink handles (not shown) that face in opposing directions. In aspects, the male locking member 810 and the female locking member 816 are engagable to firmly couple sink handle cuff 806 with sink handle cuff 812. When engaged, the sink handle cuffs 806 and 812 prevent the sink handles (not shown) from being rotated to an undesired "on" or "hot" position.

Figure 9:
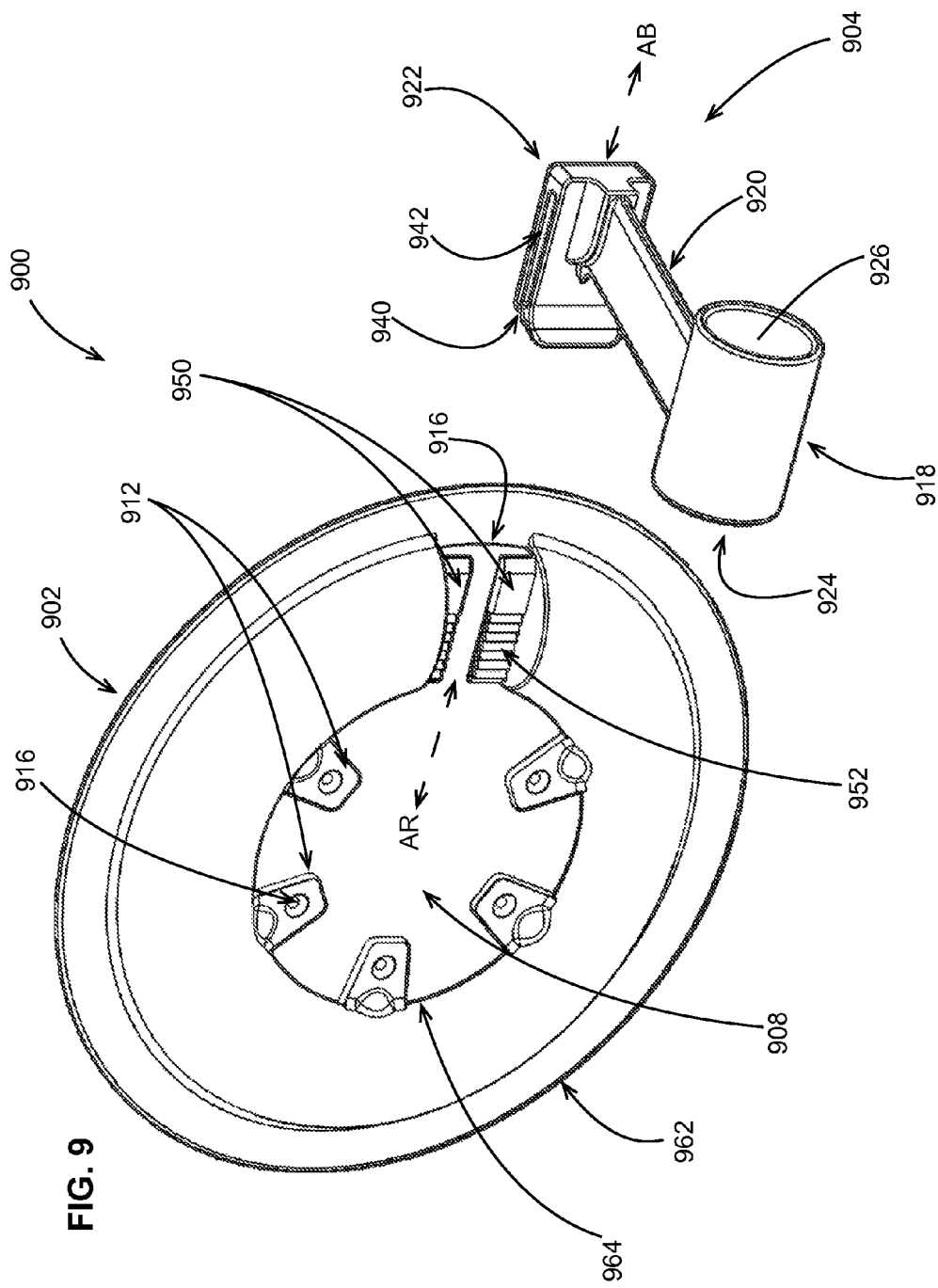
FIG. 9 illustrates a partially exploded perspective view of an embodiment of a shower handle restraint.

FIG. 9 illustrates a partially exploded perspective view of an embodiment of a shower handle restraint 900. Shower handle restraint 900 may include a circular cover plate 902 and a shower handle cuff 904. Circular cover plate 902 may be defined by an outer border 962 and an inner border 964. Circular cover plate 902 may further define a center hole 908 adjacent inner boarder 964 that is configured to fit around a base plate of a shower handle (not shown) and/or a shower handle (not shown). The circular cover plate 902 may include tab members (e.g., tab members 912) that may include holes (e.g., hole 914). The holes (e.g., hole 914) may be configured to receive a screw or other coupling apparatus to allow the circular cover plate 902 to be mounted to the base plate (not shown) of a shower handle (not shown). In another embodiment, the coupling apparatus may include double-sided tape whereby the circular cover plate 902 may be mounted by applying the double-sided tape (not shown) at or near an inner surface of the outer border 962 of the circular cover plate 902. In aspects, the double-sided tape may engage a surface behind the circular cover plate 902, e.g., a shower wall (not shown) or a base plate (not shown) of a shower handle (not shown). In another embodiment, the circular cover plate 902 may be mounted by using affixing elements in combination with double-sided tape for a more secure fit.

The circular cover plate 902 may further define a radial pathway 916 extending from the outer border 962 to the inner border 964 and having a predetermined width. In a first aspect, the radial pathway 916 may be defined by a radial depression or groove having a predetermined width. In some embodiments, the radial depression may further include a plurality of serrated grips 952 that run orthogonal to the axis $A_R$ along the radial depression. In embodiments, serrated grips 952 may be flexible or inflexible ridges, teeth, grooves, and the like. The plurality of serrated grips 952 may be configured to receive a locking element 940 of the base 922.

Alternatively, the radial pathway 916 may be defined by a radial cut-out or aperture having a predetermined width. In embodiments, the radial cut-out may include at least one flange 950 along at least one edge of the radial cut-out. In some aspects, the radial cut-out may include two flanges 950 extending along both edges of the radial cut-out. In this case, the two flanges 950 may form a dual guide along radial pathway 916 so as to slidably receive a base 922 of the shower handle cuff 904. In additional aspects, the two flanges 950 of the radial pathway 916 may include a plurality of serrated grips 952. In embodiments, serrated grips 952 may be flexible or inflexible ridges, teeth, grooves, and the like. The plurality of serrated grips 952 may be configured to receive a locking element 940 of the base 922. In aspects, the width of the radial pathway 916 (whether a radial depression or a radial aperture) may be substantially the same as a width of base 922.

The shower handle cuff 904 may include a hollow cylindrical body 918 that includes a receiving end 924 and an open end 926. The hollow cylindrical body 918 is configured to receive a shower faucet handle (not shown). Further, the hollow cylindrical body 918 is configured to receive a variety of sizes of shower handles (not shown). The shower handle cuff 904 may include an extended neck 920 and the base 922. The hollow cylindrical body 918 is located on an end of the extended neck 920 that is distal from base 922. As detailed above, the base 922 may be configured to slidably engage with the plurality of serrated grips 952 on flanges 950. Additionally, the base 922 is defined by base axis $A_B$.

Base 922 of shower handle cuff 904 defines a guide 942 configured to receive the flanges 950 of the dual-path opening 916. In some aspects, guide 942 may be a lateral slit at least partially bisecting base 922 longitudinally from a front edge toward a back edge of base 922, but not completely bisecting base 922. Alternatively, the guide 942 may include one or more grooves on an outer surface of base 922 that run longitudinally from a front edge toward a back edge along lateral sides of base 922. For example, in some aspects, one groove may be provided on one lateral side of base 922 and another groove may be provided on an opposing lateral side of base 922. In still other aspects, guide 942 may include one or more ridges on an outer surface of base 922 that run longitudinally from a front edge toward a back edge along lateral sides of base 922.

In further aspects, base 922 may include a locking element 940 (partially shown) at or along a front edge of base 922. Locking element 940 may be a lip, ridge, rim, tab, tooth, pawl, or other type of engaging element. The locking element 940 may be configured to engage with at least one of the plurality of serrated grips 952 on the one or more flanges 950.

To enter a locked position, shower handle cuff 904 may be advanced along a radial axis, $A_R$, of the circular cover plate 902 so that a shower handle (not shown) is received in a receiving end 924 of shower handle cuff 904. Substantially concurrently, as shower handle cuff 904 is advanced along a radial axis $A_R$ of the circular cover plate 902, base 922 is advanced into radial pathway 916 such that at least one serrated grip of the radial pathway 916 engages the locking element 940 of base 922. For example, in one aspect, guide 942 of base 922 may comprise a lateral slit that advances over a radial depression of radial pathway 916, whereby locking element 940 engages at least one serrated grip along the radial depression. In another aspect, guide 942 of base 922 may comprise one or more lateral grooves such that as base 922 advances along radial pathway 916, the lateral grooves slidably engage one or more flanges along edges of radial pathway 916, whereby locking element 940 engages at least one serrated grip 952 along the one or more flanges. When locking element 940 engages at least one of the plurality of serrated grips 952, shower handle cuff 904 is installed on the shower handle (not shown) such that the shower handle cannot be actuated to an "on" or "hot" position.

Shower handle cuff 904 and circular cover plate 902 may be made of any suitable material, e.g., plastic, rubber, metal, metal alloy, etc. Additionally or alternatively, shower handle cuff 904 and circular cover plate 902 may be made of a combination of materials. In some embodiments, shower handle cuff 904 and circular cover plate 902 may be made of the same material or combination of materials. In other embodiments, shower handle cuff 904 and circular cover plate 902 may be made of the different materials or different combinations of materials. Moreover, shower handle cuff 904 and circular cover plate 902 may be manufactured or produced by any suitable method, e.g., machining, molding, casting, forming, joining, pressing, 3D printing, etc.

Figure 10:
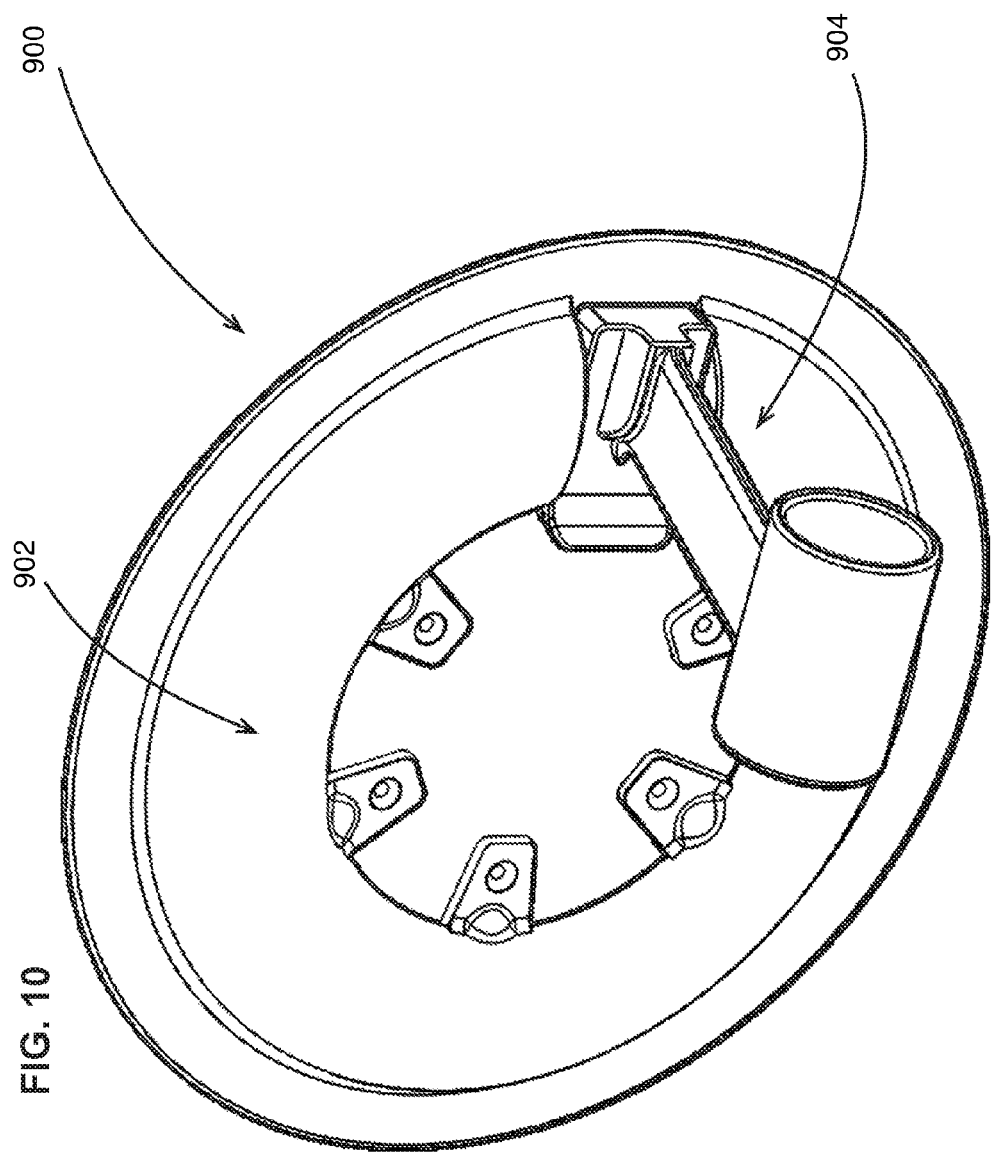
FIG. 10 illustrates a perspective view of an embodiment of a shower handle restraint.

FIG. 10 illustrates a perspective view of an embodiment of a shower handle restraint 900. Components of shower handle restraint 900 are described above with respect to FIG. 9 and are not necessarily described further. With respect to FIG. 10, shower handle restraint 900 is in a locked position. When shower handle restraint 900 is in the locked position, a locking element (not shown) may be engaged with one of the plurality of serrated grips (not shown) along a radial pathway (not shown) on the circular cover plate 902. Additionally, as described above, when shower handle restraint 900 is in a locked position, shower handle cuff 904 may engage a shower handle (not shown) such that the shower handle cannot be actuated to an "on" or "hot" position.

Figure 11:
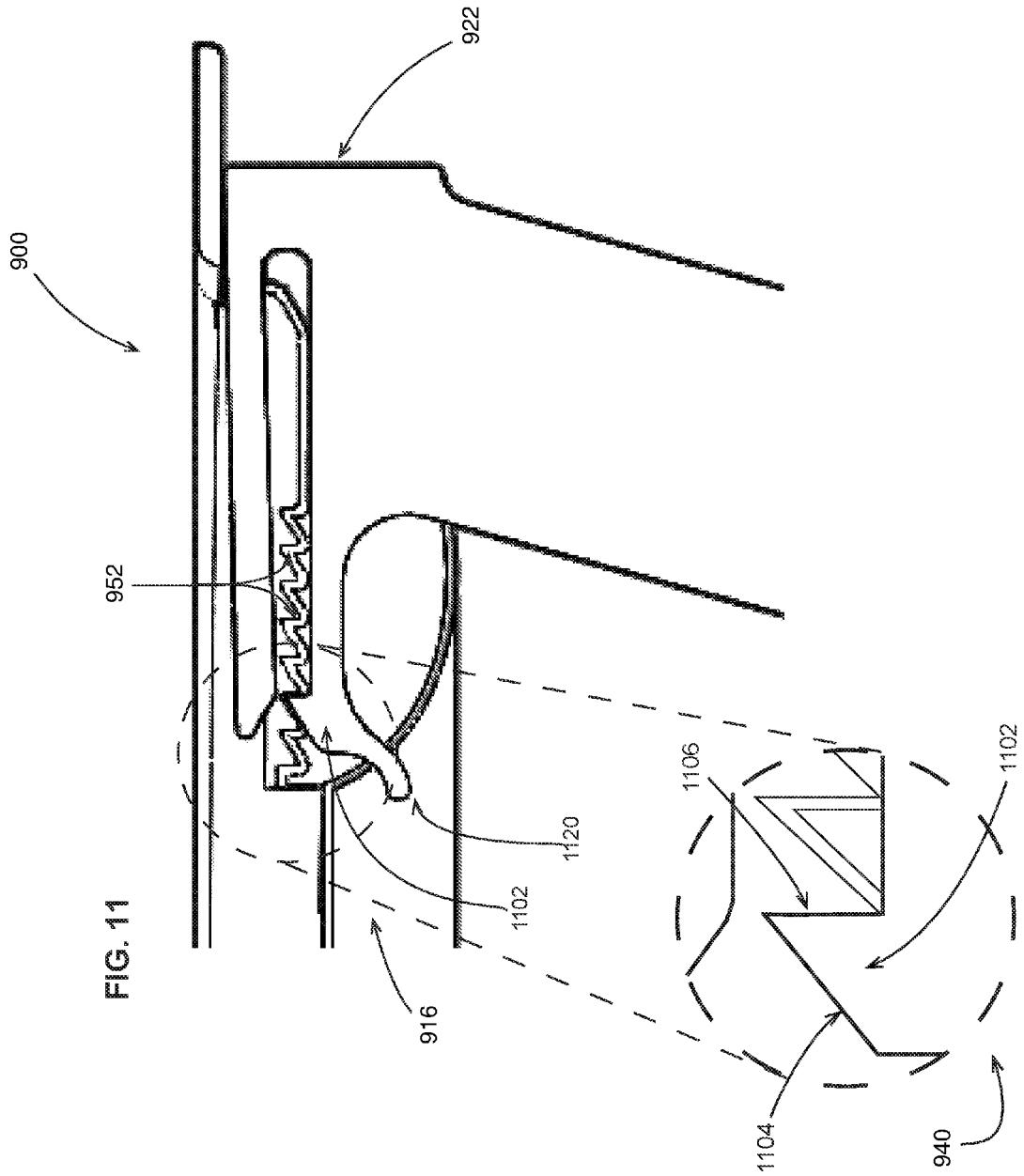
FIG. 11 illustrates a cross-sectional view of an embodiment of a locking element engaging flanges of a circular cover plate of a shower handle restraint.

FIG. 11 illustrates a cross-sectional view of a locking element 940 engaging a serrated grip 952 along a radial pathway 916 of a circular cover plate in an embodiment of a shower handle restraint 900. In some aspects, the locking element 940 is a tooth 1102 that includes a sloped leading face 1104 and a substantially vertical trailing face 1106. Tooth 1102 may be substantially in the shape of a pyramid or triangular prism. For example, when a base 922 of a shower handle cuff is slidably engaged along a radial pathway 916 of a circular cover plate, as described above, locking element 940 may engage at least one serrated grip 952. That is, while the shower handle cuff is being advanced, locking element 940 tensionally deflects (via the sloped leading face 1104) away from an edge (e.g., edge 1108) of a serrated grip 952. When the shower handle cuff advances and engages at least one serrated grip 952 at a desired position, trailing face 1106 of tooth 1102 may prevent the shower handle cuff from being withdrawn in a direction away from the shower handle unless the locking element 940 is lifted and disengaged from the at least one serrated grip 952, e.g., by release member 1120. If locking element 940 is lifted and disengaged from the at least one serrated grip 952 (e.g., via release member 1120), shower handle cuff may be slidably removed by withdrawing the base along the radial pathway 916 in a direction away from the shower handle.

Figure 12:
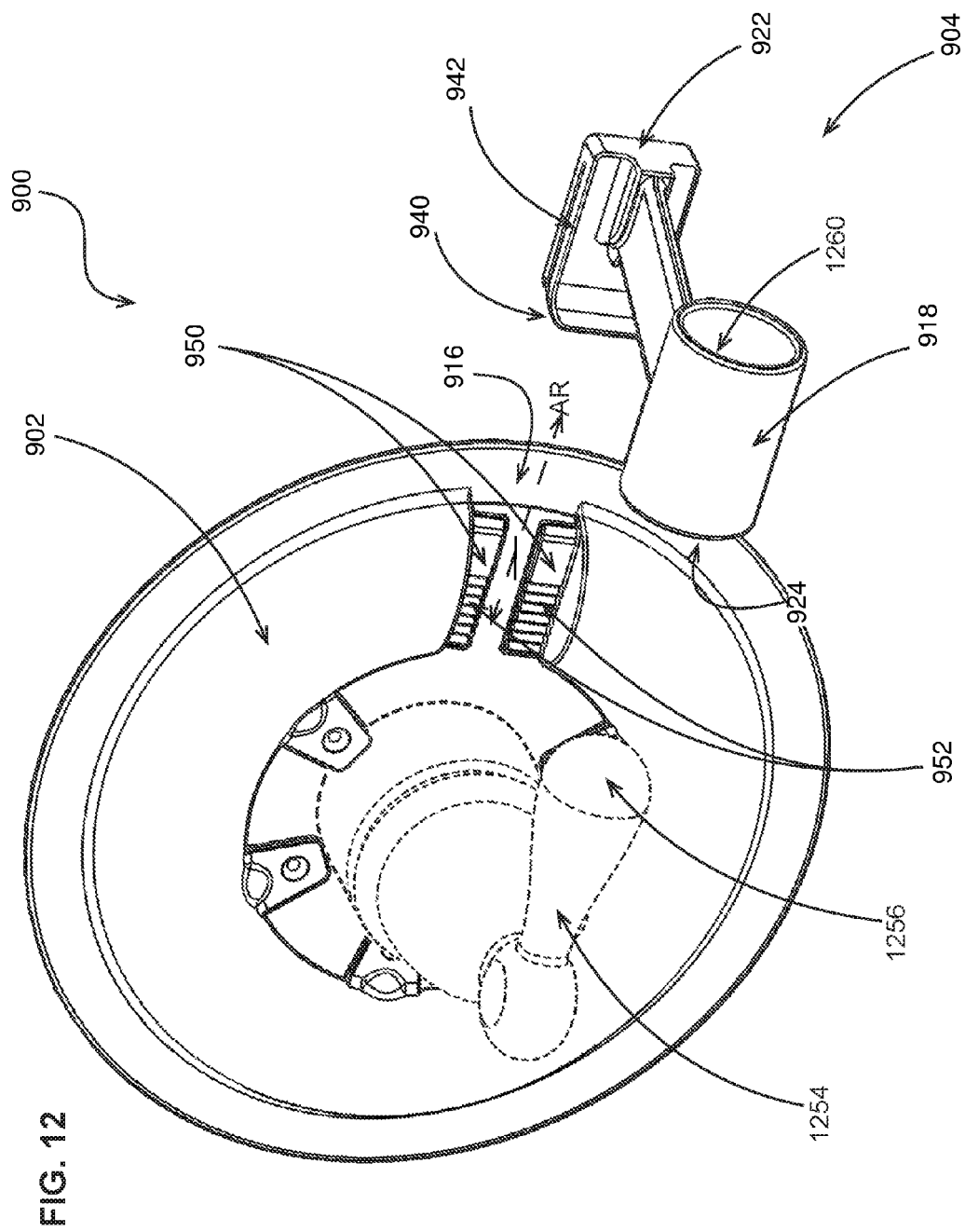
FIG. 12 illustrates a perspective view of an embodiment of a shower handle restraint partially assembled on a shower handle.

FIG. 12 illustrates a perspective view of an embodiment of a shower handle restraint 900 partially assembled on a shower handle 1254. Components of shower handle restraint 900 are described above with respect to FIGS. 9, 10, and 11 and are not necessarily described further. To enter into a locked position, base 922 of shower handle cuff 904 is advanced in a direction parallel to radial axis $A_R$ such that hollow cylindrical body 918 is concurrently advanced toward handle 1254. While advancing, guide 942 may be received in radial pathway 916. For example, a lateral slit or lateral grooves of guide 942 may engage the flanges 950 along the edges of a radial aperture of circular cover plate 902, and the receiving end 924 of the hollow cylindrical body 918 may receive a distal end 1256 of the shower handle 1254. Distal end 1256 may pass substantially through receiving end 924 into the hollow cylindrical body 918 and out an open end 1260 until shower handle cuff 904 is in a desired position around shower handle 1254. In aspects, upon reaching the desired position, hollow cylindrical body 918 may substantially encapsulate shower handle 1254. In other aspects, hollow cylindrical body 918 may substantially encapsulate a proximal portion of shower handle 1254 and a distal portion of shower handle 1254 may substantially extend out of open end 1260.

In further aspects, the locking element 940 (partially shown) of base 922 of shower handle cuff 904 may engage one of the plurality of serrated grips 952 that are located on the flanges 950 of the circular cover plate 902, thereby coupling shower handle cuff 904 to the circular cover plate 902.

Figure 13:
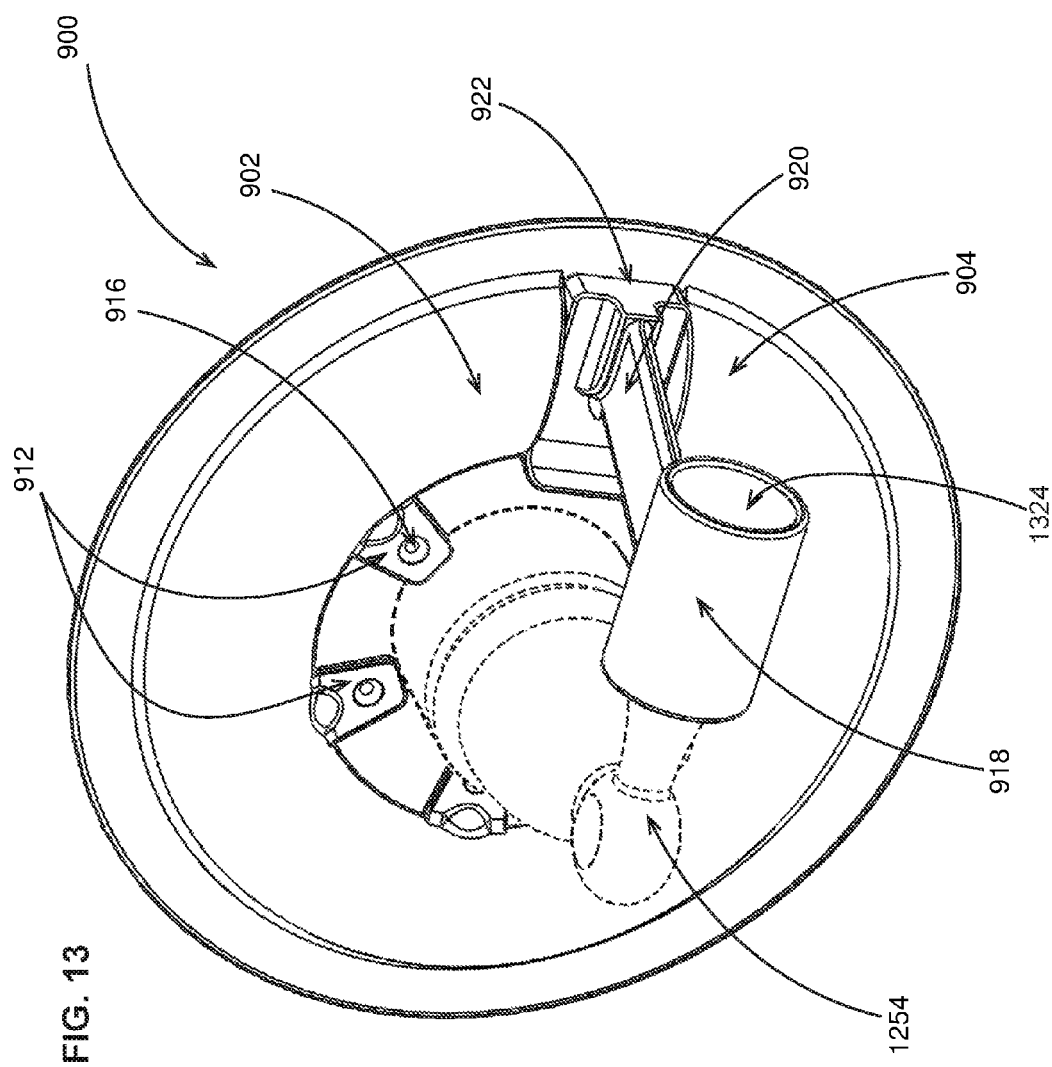
FIG. 13 illustrates a perspective view of an embodiment of a shower handle restraint assembled on a shower handle.

FIG. 13 illustrates a perspective view of an embodiment of a shower handle restraint 900 assembled on a shower handle 1254. Components of shower handle restraint 900 are described above with respect to FIGS. 9, 10, 11, and 12 and are not necessarily described further. According to FIG. 13, shower handle restraint 900 is in a locked position on shower handle 1254. Further, circular cover plate 902 may be attached to a surface behind shower handle 1254, e.g., a base plate of the shower handle 1254 (not shown) or the wall of the shower (not shown), via a coupling apparatus such as double-sided tape (not shown) or one or more screws or other affixing elements (not shown) affixed through one or more holes 1316 in one or more tab members 912. In some aspects, the circular cover plate 902 may be mounted by using affixing elements in combination with double-sided tape for a more secure fit. When in the described locked position, hollow cylindrical body 918 of shower handle cuff 904 may keep the shower handle 1254 from being actuated to an undesired "on" or "locked" position.

In another embodiment, shower handle cuff 904 may include alternative embodiments of hollow cylindrical bodies 1318 configured in a manner such that the shower handle cuff 904 may capture different sizes and styles of shower handles 1254 (i.e. a shower handle that extends closer to or further away from a shower wall and/or that includes a larger diameter shower handle). For example, if the shower handle 1254 is placed closer to the wall, a hollow cylindrical body 918 that is nearer to the base 922 of the shower handle cuff 904 may receive the shower handle 1254. In other examples, if the shower handle is placed further from the wall, a hollow cylindrical body 918 that is further away from the base 922 of the shower handle cuff 904 may receive the shower handle 1254. This may allow a shower handle restraint be configurable with a variety of different styles and sizes of shower handles.

In another embodiment, hollow cylindrical body 918 may be sized to fit various sized shower handles 1254. That is, hollow cylindrical body 918 may have an increased diameter to fit a larger sized shower handle 1254 or a decreased in diameter to fit a smaller sized shower handle 1254.

In some embodiments, an inner cylindrical surface 1324 of hollow cylindrical body 918 of shower handle cuff 904 may include a liner (not shown) that may act as a buffer element between inner cylindrical surface 1324 and an outer surface of the shower handle 1254. For example, the liner may prevent scratching of shower handle 1254 and may facilitate a more secure fit for inner cylindrical surface 1324. In aspects, the liner may be made of rubber, silicone, plastic, felt, and the like.

In another embodiment, shower handle cuff 904 may include a neck 920 that is adjustable. In this embodiment, the hollow cylindrical body 918 may be adjusted to a position nearer to the base 922 or further away from the base 922 of the shower handle cuff 904 depending on the placement of shower handle 1254. Because of the adjustability, the shower handle restraint 900 may be adapted to a variety of different shower handle styles and sizes.

In the same or another embodiment, circular cover plate 902 may include a number of radial pathways (not shown) placed in different locations around circular cover plate 902. This embodiment allows for the shower handle cuff 904 to be placed in a variety of different positions so that the shower handle 1254 may be locked in different positions.

Figure 14:
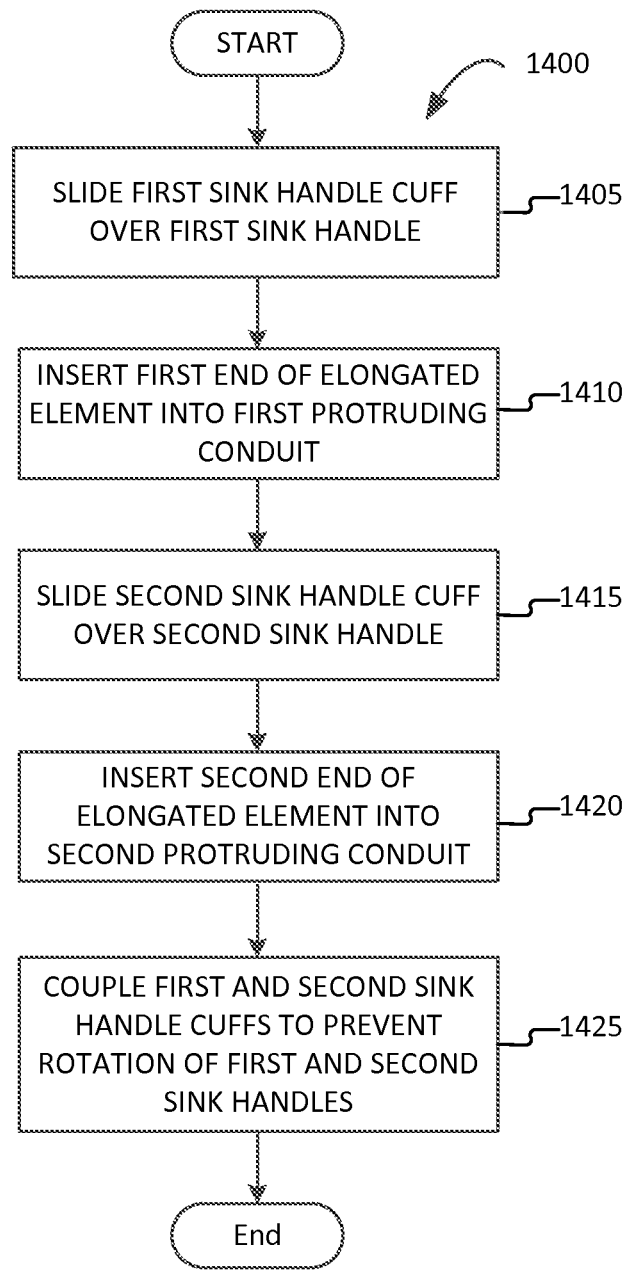
FIG. 14 is a flow diagram representing an embodiment of a method for installing a sink handle restraint on a sink faucet.

FIG. 14 is a flow diagram representing an embodiment of a method 1400 for installing a sink handle restraint on a sink faucet. Sliding operation 1405 slides a first sink handle cuff over a first sink handle. Sliding operation 1405 may include sliding a first hollow cylindrical body of the first sink handle cuff over the first sink handle so that the first sink handle is substantially encapsulated by the first hollow cylindrical body. Sliding operation 1405 may also include positioning the first sink handle cuff such that a first protruding conduit on the first sink handle cuff is positioned toward the back of the sink faucet.

Inserting operation 1410 inserts a first end of an elongated element into a first gap defined by the first protruding conduit of the first sink handle cuff. In embodiments, the elongated element includes a plurality of slots on at least an upper surface. Inserting operation 1410 includes inserting the elongated element into the first gap in an orientation such that the plurality of slots is adjacent to a first locking element associated with the first protruding conduit. Inserting operation 1410 may further include sliding the elongated body to a desired position with respect to the first sink handle cuff such that the locking element engages at least one slot of the elongated element.

In some cases, inserting operation 1410 may be completed before sliding operation 1405. In this aspect, inserting operation 1410 inserts a first end of an elongated element into the first gap defined by the first protruding conduit on the first sink handle cuff. A coupled sink handle cuff may be formed upon coupling the first sink handle cuff to the elongated element. The coupled sink handle cuff may then be slid (e.g., by sliding operation 1405) onto a first sink handle and positioned.

A second sliding operation 1415 slides a second sink handle cuff over a second sink handle. Sliding operation 1415 may include sliding a second hollow cylindrical body of the second sink handle cuff over the second sink handle so that the second sink handle is substantially encapsulated by the second hollow cylindrical body.

A second insert operation 1420 may include positioning the second sink handle cuff so that a second gap defined by a second protruding conduit on the second sink handle cuff receives a second end of the elongated body. Further, insert operation 1420 may include advancing the second sink handle cuff onto the second sink handle and along the elongated element to a desired position. At the desired position, insert operation 1420 includes advancing the second sink handle cuff along the elongated element such that the plurality of slots is adjacent to a second locking element associated with a second protruding conduit.

A locking operation 1425 may include securely coupling the first sink handle cuff and the second sink handle cuff via the elongated element such that the first sink handle and the second sink handle are prevented from rotating into an "on" or "hot" position. For example, in aspects, a first locking element of the first sink handle cuff may engage at least a first slot along the elongated element and a second locking element of the second sink handle cuff may engage at least a second slot along the elongated element so as to couple the first and second sink handle cuffs to one another via the elongated element. Coupling the first and second sink handle cuffs to one another prevents the first and second sink handles from rotating into an "on" or "hot" position.

Figure 15:
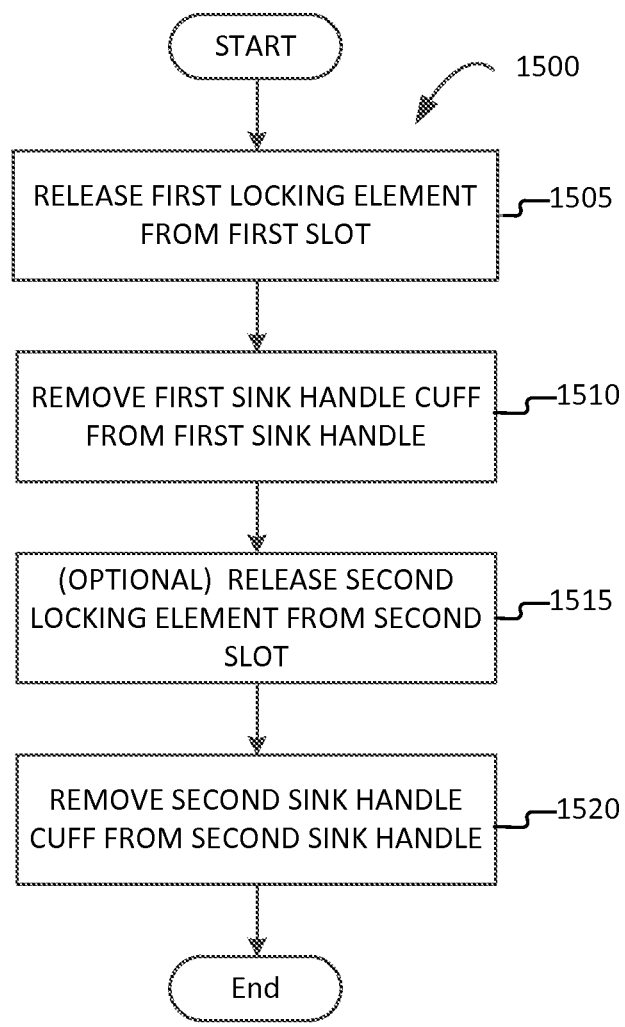
FIG. 15 is a flow diagram representing an embodiment of a method for removing a sink handle restraint from a sink faucet.

FIG. 15 is a flow diagram representing an embodiment of a method for removing 1500 an embodiment of a sink handle restraint from a sink faucet.

Release operation 1505 may include pressing a first release tab on a first protruding conduit of the first sink handle cuff thereby disengaging a first locking element from a first slot of the elongated element.

Remove operation 1510 may include substantially concurrently withdrawing the first sink handle cuff off of the first sink handle along an elongated element while pressing the first release tab. Alternatively, remove operation 1510 may include withdrawing the first sink handle cuff off of the first sink handle along an elongated element at any time after activating the first release tab.

An optional release operation 1515 may include pressing a second release tab on a second protruding conduit of the second sink handle cuff thereby disengaging a second locking element from a second slot of the elongated element. In this example, the second sink handle cuff and the first sink handle cuff may be substantially concurrently withdrawn along the elongated element by substantially concurrently pressing the first and second release tabs and withdrawing the first sink handle cuff in one direction along the elongated element while withdrawing the second sink handle cuff in an opposite direction along the elongated element.

A second removing operation 1520 removes a second sink handle cuff from a second sink handle. Removing operation 1520 may include withdrawing the second sink handle cuff from the second sink handle while a locking element is still engaged with at least one slot of the elongated element. Alternatively, remove operation 1520 may include substantially concurrently withdrawing the second sink handle cuff off of the second sink handle along an elongated element while pressing the second release tab.

Figure 16:
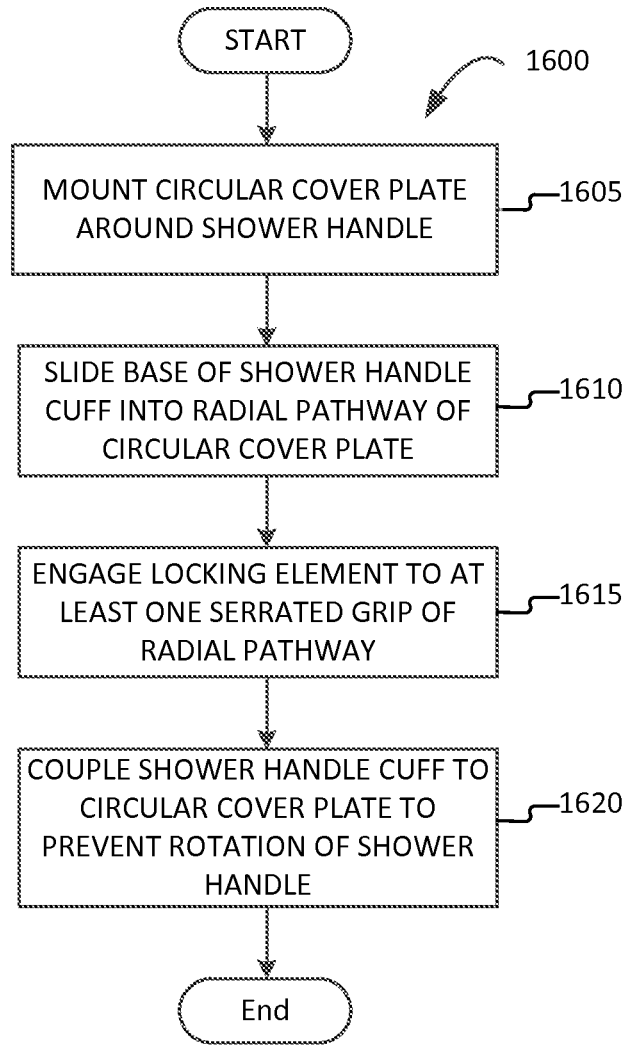
FIG. 16 is a flow diagram representing an embodiment of a method for installing an embodiment of a shower handle restraint on a shower handle.

FIG. 16 is a flow diagram representing an embodiment of a method for installing 1600 an embodiment of a shower handle restraint on a shower handle.

Mounting operation 1605 mounts a circular cover plate around a shower handle and onto a surface behind the shower handle, e.g. a wall of a shower or onto a base plate of a shower handle. Mounting operation 1605 may include positioning the circular cover plate so that an axis of a radial pathway of the circular cover plate is parallel to an axis of the shower handle when the shower handle is in an "off" or other desired position. Mounting operation 1605 may include fastening the circular cover plate to the shower wall or base plate of the shower handle by using double sided tape. Conversely, mounting operation 1605 may include fastening the circular cover plate to the shower wall or base plate of the shower handle by inserting screws or other affixing elements into one or more tab members of the circular cover plate so that the circular cover plate is held in place. Further, mounting operation 1605 may include using both double-sided tape and affixing elements concurrently to fasten the circular cover plate to the wall and/or the base plate of the shower handle.

Slide operation 1610 slides a base of the shower handle cuff into a radial pathway of the circular cover plate. Slide operation 1610 may include sliding the shower handle cuff over the shower handle as the base of the show handle cuff slides along the radial pathway. For example, the shower handle cuff may be installed by advancing the shower handle cuff towards the shower handle so that a hollow cylindrical body of the shower handle cuff receives the shower handle and a base of the shower handle cuff receives the radial pathway of the circular cover plate.

Engage operation 1615 causes a locking element of the base to engage a serrated grip of the radial pathway to secure the shower handle cuff to the circular cover plate. In aspects, when the locking element engages the serrated grip of the radial pathway, the shower handle cuff is prevented from being withdrawn from the circular cover plate.

Couple operation 1620 couples the shower handle cuff to the circular cover plate such that the shower handle is prevented from being actuated to an "on" or "hot" position.

Embodiments of the present disclosure, for example, are described above with reference to block diagrams and/or operational illustrations of methods, systems, and computer program products according to embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode recited by the claims. The claims should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A shower handle restraint comprising:
   a circular cover plate, the circular cover plate including:
      a radial pathway defined between an outer border of the circular cover plate and an inner border of the circular cover plate; and
      a plurality of serrated grips arranged along the radial pathway; and
   a shower handle cuff including:
      a hollow cylindrical body, the hollow cylindrical body adapted to slide over a shower handle to prevent movement of the shower handle;
      a base, the base defining a guide adapted to slide along the radial pathway of the circular cover plate and engage at least one serrated grip of the plurality of serrated grips.

2. The shower handle restraint of claim 1, wherein the radial pathway comprises at least one flange, and where the plurality of serrated grips are arranged along the at least one flange.

3. The shower handle restraint of claim 2, wherein the base includes a locking element, and wherein the locking element engages at least one serrated grip of the plurality of serrated grips when the at least one flange slides to a desired position.

4. The shower handle restraint of claim 3, wherein a position of the shower handle cuff with respect to the circular cover plate is adjusted by selectively engaging the locking element with a different serrated grip of the plurality of serrated grips.

5. The shower handle restraint of claim 3, wherein disengaging the locking element from the at least one serrated grip decouples the shower handle cuff from the circular cover plate.

6. The shower handle restraint of claim 1, wherein the circular cover plate includes a coupling apparatus, and wherein the coupling apparatus couples the circular cover plate to a surface behind the shower handle.

7. The shower handle restraint of claim 6, wherein when the shower handle cuff is adjustably coupled to the circular cover plate, the shower handle is maintained in a desired position.

* * * * *